US008979634B2

(12) United States Patent
Pacey et al.

(10) Patent No.: US 8,979,634 B2
(45) Date of Patent: Mar. 17, 2015

(54) WAGERING GAMES WITH REEL ARRAY INTERACTING WITH SIMULATED OBJECTS MOVING RELATIVE TO THE REEL ARRAY

(71) Applicant: WMS Gaming Inc., Waukegan, IL (US)

(72) Inventors: Larry J. Pacey, Chicago, IL (US); Joel R. Jaffe, Glenview, IL (US); Dion K. Aoki, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 32 days.

(21) Appl. No.: 13/715,179

(22) Filed: Dec. 14, 2012

(65) Prior Publication Data

US 2013/0157742 A1 Jun. 20, 2013

Related U.S. Application Data

(60) Provisional application No. 61/576,200, filed on Dec. 15, 2011.

(51) Int. Cl.

*A63F 13/00* (2014.01)
*G07F 17/32* (2006.01)
*G07F 17/34* (2006.01)

(52) U.S. Cl.

CPC ............ *A63F 13/00* (2013.01); *G07F 17/3211* (2013.01); *G07F 17/3267* (2013.01); *G07F 17/34* (2013.01)

USPC .................. 463/20; 463/16; 463/17; 463/18; 463/19; 463/25; 463/31; 463/32; 463/33

(58) Field of Classification Search

CPC . G07F 17/32; G07F 17/3211; G07F 17/3202; G07F 17/3209; G07F 17/3227; G07F 17/3223; G07F 17/323; G07F 17/3237; G07F 17/3239; G07F 17/3218; G07F 17/3206; G07F 17/3232; G07F 17/3216; G07F 17/03; A63F 13/12; A63F 2300/552; A63F 2300/402; A63F 2300/538; A63F 2300/407; A63F 2300/577; A63F 2300/513; A63F 2300/534; A63F 2300/535; A63F 2300/572; A63F 2300/69; A63F 13/00; A63F 2300/554; G06F 2221/2111; G06F 21/32; G06F 13/1605; G06F 13/385; G06F 21/10; G06F 21/31; G06F 21/34; G06F 2221/0773; G06F 2221/2101; G06F 2221/2109; G06T 13/40; G06T 1/60; G07C 9/00103; G07C 9/00111; H04N 13/0495; H04N 13/0475; H04N 13/0275; H04N 13/0285; H04N 13/0404; H04N 13/0409; H04N 13/0422; H04N 13/0445; H04N 13/047

See application file for complete search history.

(56) References Cited

U.S. PATENT DOCUMENTS 5,880,709 A 3/1999 Itai et al.
6,135,884 A 10/2000 Hedrick et al.

(Continued)

*Primary Examiner* — Sunit Pandya
(74) *Attorney, Agent, or Firm* — Nixon Peabody LLP

(57) ABSTRACT

Gaming devices, gaming systems, methods of conducting a wagering game, and computer programs for executing a wagering game are presented herein. A gaming system for conducting a wagering game is disclosed which includes a memory device that stores instructions which, when executed by a processor, causes the gaming system to: display a symbol array at a first position of a three-dimensional (3D) space; display a 3D object at a second position of the 3D space, the 3D object having two or more surfaces each lying in a respective plane of the 3D space and each having a respective symbol modifier; display the 3D object and/or symbol array moving towards each other; display, in the symbol array, symbols indicative of a wagering-game outcome; and, in response to the 3D object engaging the array, modify each of the symbol-array symbols by the symbol modifier of the 3D object which engages that symbol.

25 Claims, 12 Drawing Sheets

(56) References Cited

U.S. PATENT DOCUMENTS

| | | | | |
|---|---|---|---|---|
| 6,254,481 | B1 | 7/2001 | Jaffe | |
| 6,347,996 | B1 | 2/2002 | Gilmore et al. | |
| 6,428,412 | B1 | 8/2002 | Anderson | |
| 6,428,413 | B1 | 8/2002 | Carlson | |
| 6,887,157 | B2 | 5/2005 | LeMay et al. | |
| 7,128,647 | B2 | 10/2006 | Muir | |
| 7,192,345 | B2 | 3/2007 | Muir et al. | |
| 7,195,559 | B2 | 3/2007 | Gilmore et al. | |
| 8,029,350 | B2 | 10/2011 | Pacey | |
| 8,357,041 | B1 * | 1/2013 | Saunders | 463/32 |
| 2001/0016513 | A1 * | 8/2001 | Muir et al. | 463/16 |
| 2003/0045345 | A1 * | 3/2003 | Berman | 463/20 |
| 2006/0189378 | A1 | 8/2006 | Aoki | |
| 2006/0240885 | A1 | 10/2006 | Thomas et al. | |
| 2008/0108411 | A1 * | 5/2008 | Jensen et al. | 463/20 |
| 2009/0137309 | A1 * | 5/2009 | Thomas | 463/20 |
| 2009/0325678 | A1 | 12/2009 | Gomez | |
| 2010/0029361 | A1 * | 2/2010 | Anderson et al. | 463/17 |
| 2010/0151943 | A1 | 6/2010 | Johnson et al. | |
| 2010/0210343 | A1 | 8/2010 | Englman et al. | |
| 2010/0234094 | A1 | 9/2010 | Gagner et al. | |
| 2011/0053675 | A1 | 3/2011 | Aoki et al. | |
| 2011/0065496 | A1 | 3/2011 | Gagner et al. | |
| 2011/0183739 | A1 | 7/2011 | Ansari et al. | |
| 2011/0281628 | A1 * | 11/2011 | Sieka | 463/16 |
| 2013/0023325 | A1 * | 1/2013 | Saunders et al. | 463/20 |

* cited by examiner

WAGERING GAMES WITH REEL ARRAY INTERACTING WITH SIMULATED OBJECTS MOVING RELATIVE TO THE REEL ARRAY

CLAIM OF PRIORITY AND CROSS-REFERENCE TO RELATED APPLICATION

This application claims the benefit of and priority to U.S. Provisional Patent Application No. 61/576,200, filed on Dec. 15, 2011, which is incorporated herein by reference in its entirety.

COPYRIGHT

A portion of the disclosure of this patent document contains material which is subject to copyright protection. The copyright owner has no objection to the facsimile reproduction by anyone of the patent disclosure as it appears in the U.S. Patent and Trademark Office patent files or records, but otherwise reserves all copyright rights whatsoever.

TECHNICAL FIELD

The present disclosure relates generally to wagering games, as well as wagering game terminals and gaming systems. More particularly, the present disclosure relates to systems, methods, and devices for playing wagering games with a reel array that interacts with objects that move relative to the reel array.

BACKGROUND

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Thus, gaming manufacturers continuously strive to develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "primary" or "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Wagering games may additionally award players with "progressive jackpot" awards that are funded, at least in part, by a percentage of coin-in from the gaming machine or a plurality of participating gaming machines.

While some current game features provide some enhanced excitement, there is still a need for additional concepts to enhance the entertainment value of electronic wagering games, such as slots, keno, poker, and blackjack. Although a lot of focus is now being paid to enhancing bonus games, there is still a lot of room for improving the basic wagering game. Such new features for wagering games will further enhance player excitement, perpetuate player loyalty, and thus increase game play and profitability.

SUMMARY

According to one aspect of the present disclosure, a gaming system for conducting a wagering game is disclosed. The gaming system includes at least one input device configured to receive a wager input to play the wagering game, at least one display device configured to display outcomes of the wagering game, and at least one processor operatively connected to the display device. The gaming system also includes at least one memory device that stores instructions which, when executed by the processor, cause the gaming system to: receive, responsive to an input via the at least one input device, a wager to play the wagering game; display, via the at least one display device, a symbol array located at a first position of a three-dimensional (3D) space; display, via the at least one display device, a 3D object located at a second position of the 3D space, the 3D object having two or more defined surfaces each lying in a respective plane of the 3D space and each having associated therewith a respective symbol modifier; display, on the at least one display device, the 3D object moving from the second position towards the symbol array at the first position; display, in the symbol array, a plurality of symbols indicative of a randomly determined outcome of the wagering game; and, in response to the moving 3D object engaging the symbol array, modify each of the symbols in the symbol array by the symbol modifier of the defined surface of the 3D object that engages that symbol.

According to other aspects of the present disclosure, a gaming system for conducting a wagering game is presented. The gaming system includes one or more display devices, one or more processors, and one or more memory devices. The memory device(s) stores instructions which, when executed by at least one of the processor(s), cause the gaming system to: receive an indication of a wager to play a wagering game; display, in an array located at a first position of a three-dimensional (3D) space of the one or more display devices, symbols associated with outcomes of the wagering game; display, via the one or more display devices, a 3D object located at a second position of the 3D space, the 3D object having a plurality of faces each lying in a respective plane of the 3D space, each of the faces bearing a respective symbol modifier; display, via the one or more display devices, the 3D object moving towards the symbol array or the symbol array moving towards the 3D object, or both; determine if the 3D object engages the symbol array; in response to the 3D object engaging the symbol array, modify each of the symbols in the symbol array by the symbol modifier of the defined surface of the 3D object that engages the symbol; and display, in the symbol array, a plurality of symbols indicative of an outcome of the wagering game, the wagering-game outcome being randomly determined from a plurality of wagering-game outcomes.

According to another aspect of the disclosure, a computer-implemented method is presented for conducting a wagering game on a gaming system with at least one input device, at least one display device, and at least one processor. The computer-implemented method includes: displaying, via the at least one display device, symbols associated with outcomes of the wagering game arranged in an array located at a first position of a three-dimensional (3D) space; displaying, via the at least one display device, a 3D object located at a second position of the 3D space, the 3D object having two or more defined surfaces each lying in a respective plane of the 3D space, each of the defined surfaces of the 3D object having associated therewith a respective symbol modifier; displaying, via the at least one display device, the 3D object moving in the 3D space from the second position towards the symbol array at the first position; displaying, in the symbol array, a plurality of symbols indicative of a randomly determined outcome of the wagering game; and, in response to the moving 3D object engaging the symbol array, modifying each of the symbols in the symbol array by the symbol modifier of the defined surface of the 3D object that engages the symbol.

Another aspect of this disclosure is directed to a computer program product comprising a non-transient computer-readable media having an instruction set borne thereby. The instruction set is configured to cause, upon execution by one or more controllers, the acts of: receiving an indication of a wager; directing a display device to: display symbols associated with outcomes of the wagering game arranged in an array located at a first position of a three-dimensional (3D) space; display a 3D object located at a second position of the 3D space, the 3D object having two or more defined surfaces each lying in a respective plane of the 3D space, each of the defined surfaces of the 3D object having associated therewith a respective symbol modifier; display the 3D object moving towards the symbol array and/or the symbol array moving towards the 3D object; display, in the symbol array, a plurality of symbols indicative of a randomly determined outcome of the wagering game; display the 3D object engaging the symbol array; and modifying each of the symbols in the symbol array by the symbol modifier of the defined surface of the 3D object that engages the symbol.

Yet another aspect of the disclosure presents a method of conducting a wagering game on a gaming system. This method includes: receiving, responsive to an input via at least one input device, a wager to play the wagering game; displaying, via at least one display device, an array of symbol positions arranged in a plurality of columns; displaying, via the at least one display device, a three-dimensional (3D) object having a plurality of defined surfaces, each of the defined surfaces bearing a symbol enhancer; causing the 3D object to visually move in a 3D space from a position distal from the array of symbol positions towards the array of symbol positions such that the displayed array of symbol positions at least partially obscures the moving 3D object; causing the 3D object to visually engage with the array; in response to one or more of the defined surfaces of the moving 3D object being in a predetermined alignment with the array of symbol positions during the engagement such that the one or more of the defined surface areas corresponds with one or more corresponding symbol positions of the array of symbol positions, adding the symbol enhancer of the one or more of the defined surface areas of the moving 3D object to the corresponding symbol positions of the array of symbol positions.

The above summary is not intended to represent each embodiment or every aspect of the present disclosure. Rather, the summary merely provides an exemplification of some of the novel features presented herein. The above features and advantages, and other features and advantages of the present disclosure, will be readily apparent from the following detailed description of exemplary embodiments and best modes for carrying out the present invention when taken in connection with the accompanying drawings and the appended claims.

Figure 1:
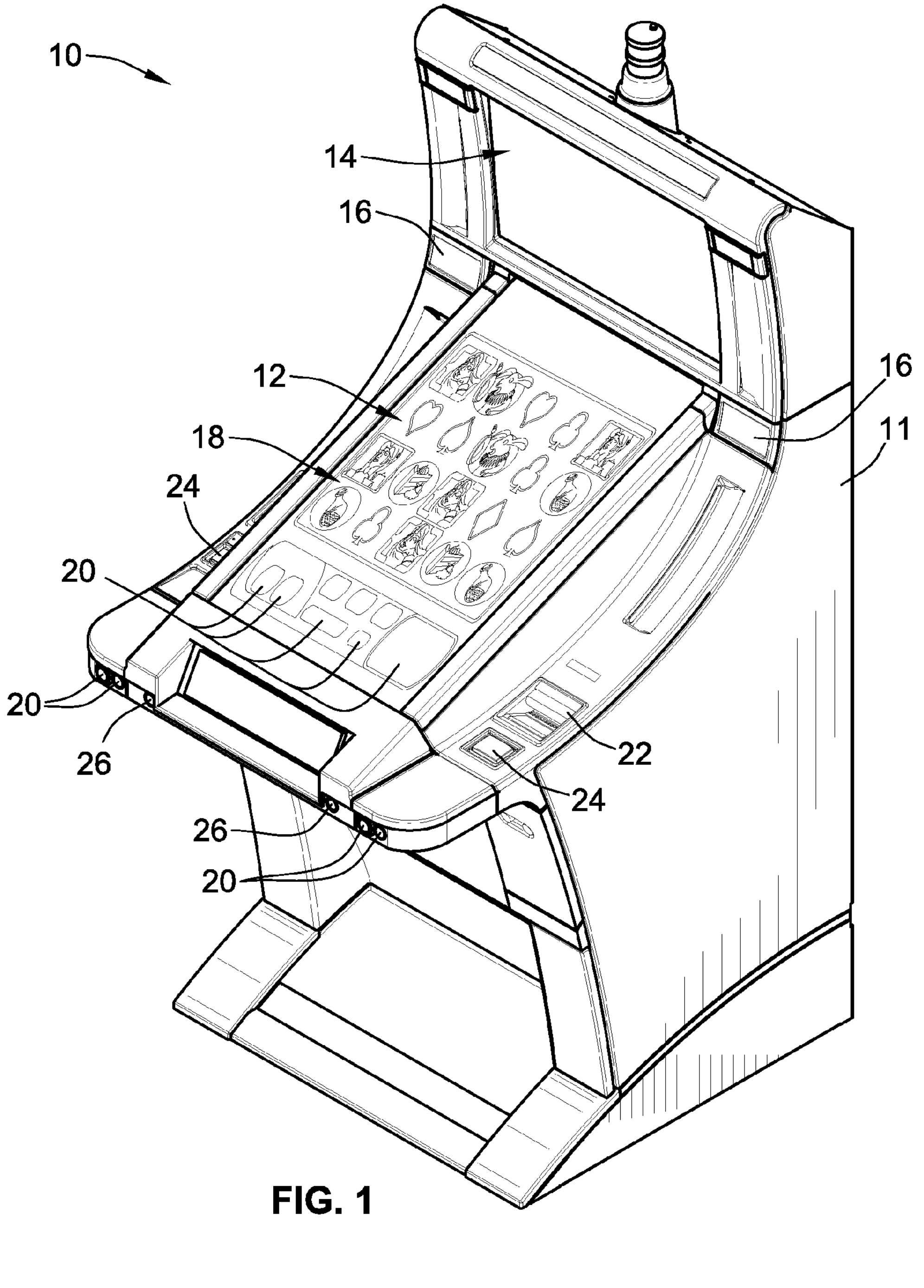
FIG. 1 is a perspective-view illustration of an exemplary free-standing gaming terminal according to aspects of the present disclosure.

While aspects of this disclosure are susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, the singular includes the plural and vice versa (unless specifically disclaimed); the words "and" and "or" shall be both conjunctive and disjunctive (unless specifically disclaimed); the word "all" means "any and all"; the word "any" means "any and all"; and the word "including" means "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring to the drawings, wherein like reference numerals refer to like features throughout the several views, there is shown in FIG. 1 a representative gaming terminal 10 similar to those used in gaming establishments, such as casinos, hotels and cruise ships, and non-conventional gaming establishments, such as airports and restaurants. With regard to the present disclosure, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433, U.S. Patent Application Publication Nos. 2010/0062196 and 2010/0234099, and International Application No. PCT/US2007/000792, all of which are incorporated herein by reference in their respective entireties.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
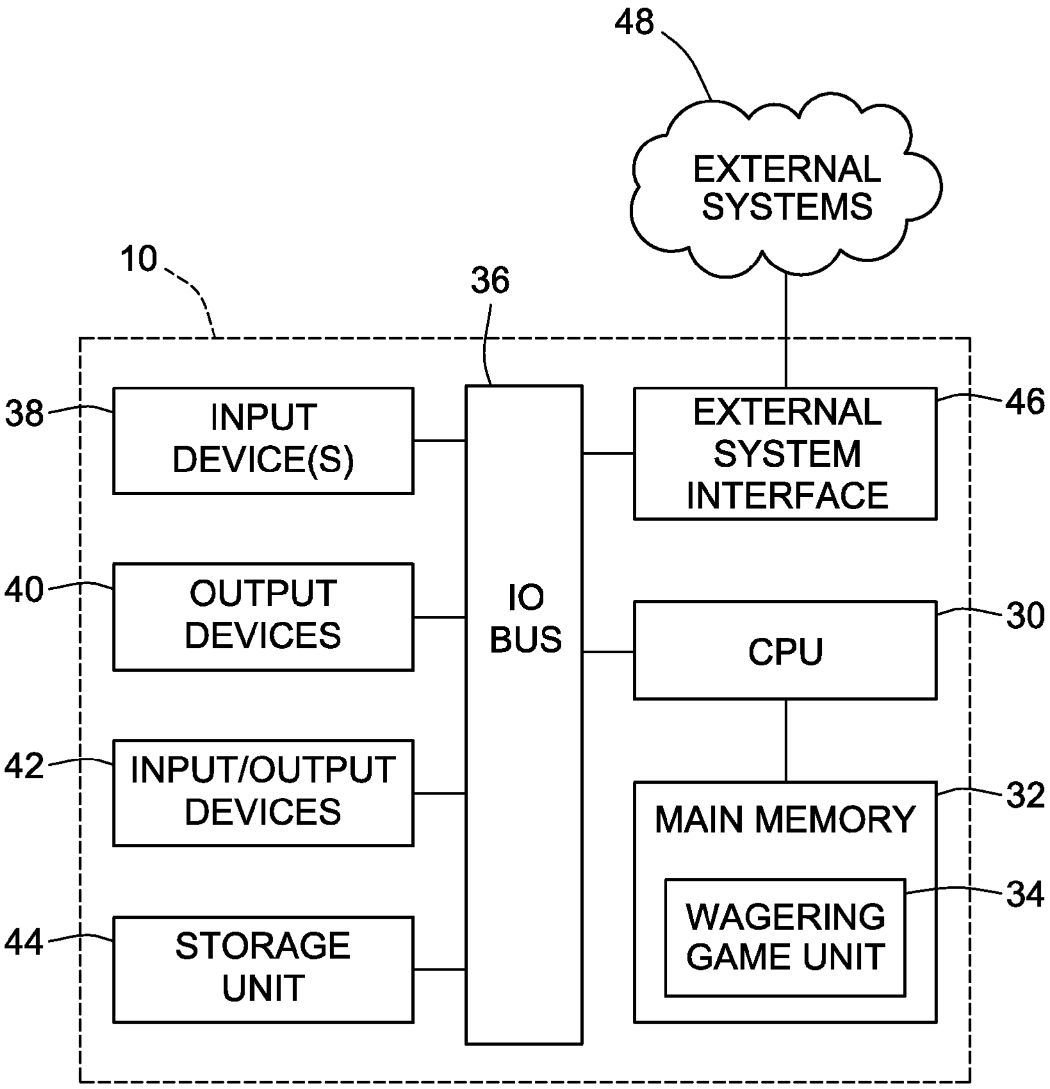
FIG. 2 is a schematic diagram of an example of a gaming system according to aspects of the present disclosure.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
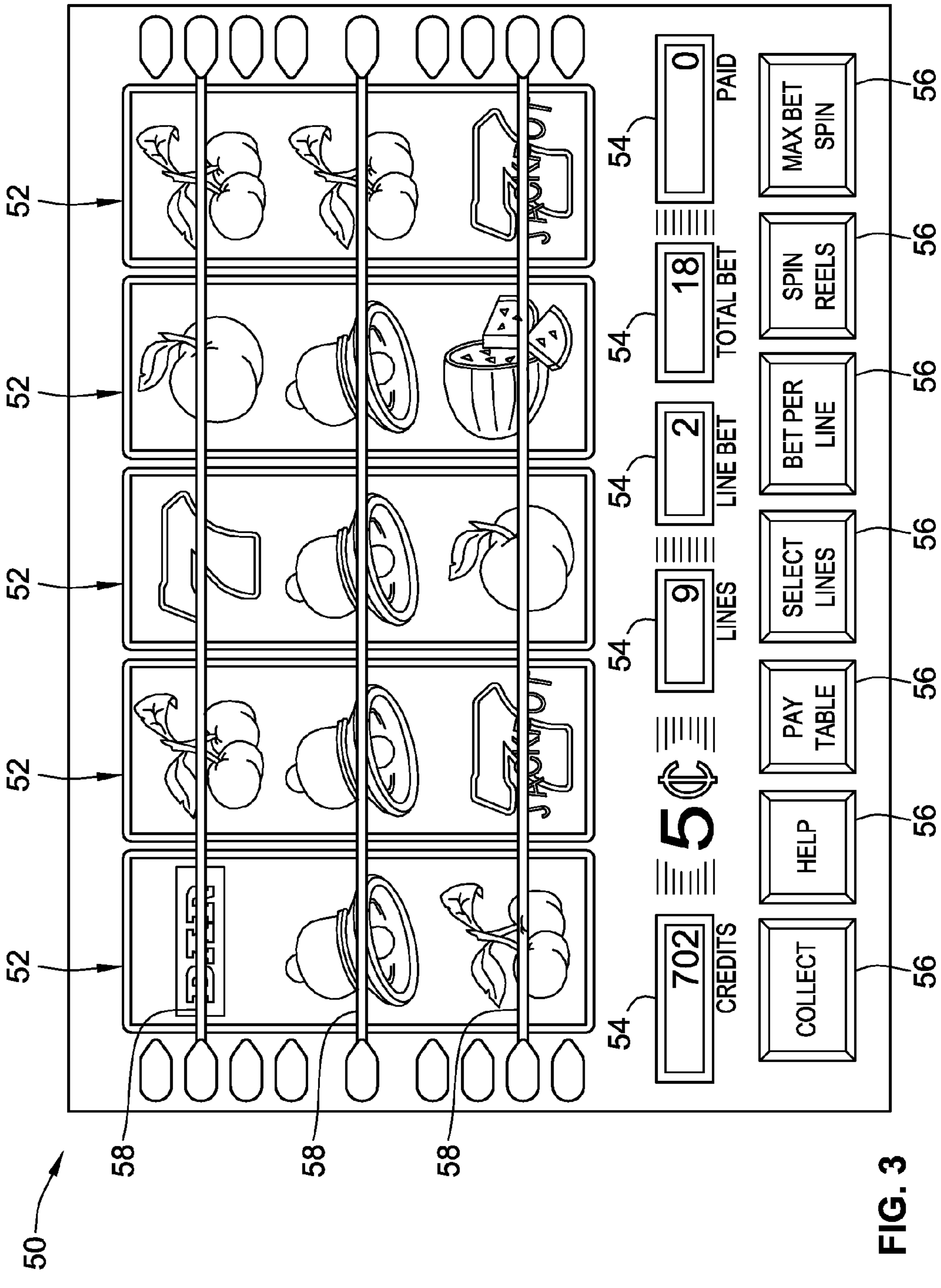
FIG. 3 is a screen shot of an exemplary basic-game screen of a wagering game displayed on a gaming terminal, according to aspects of the present disclosure.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
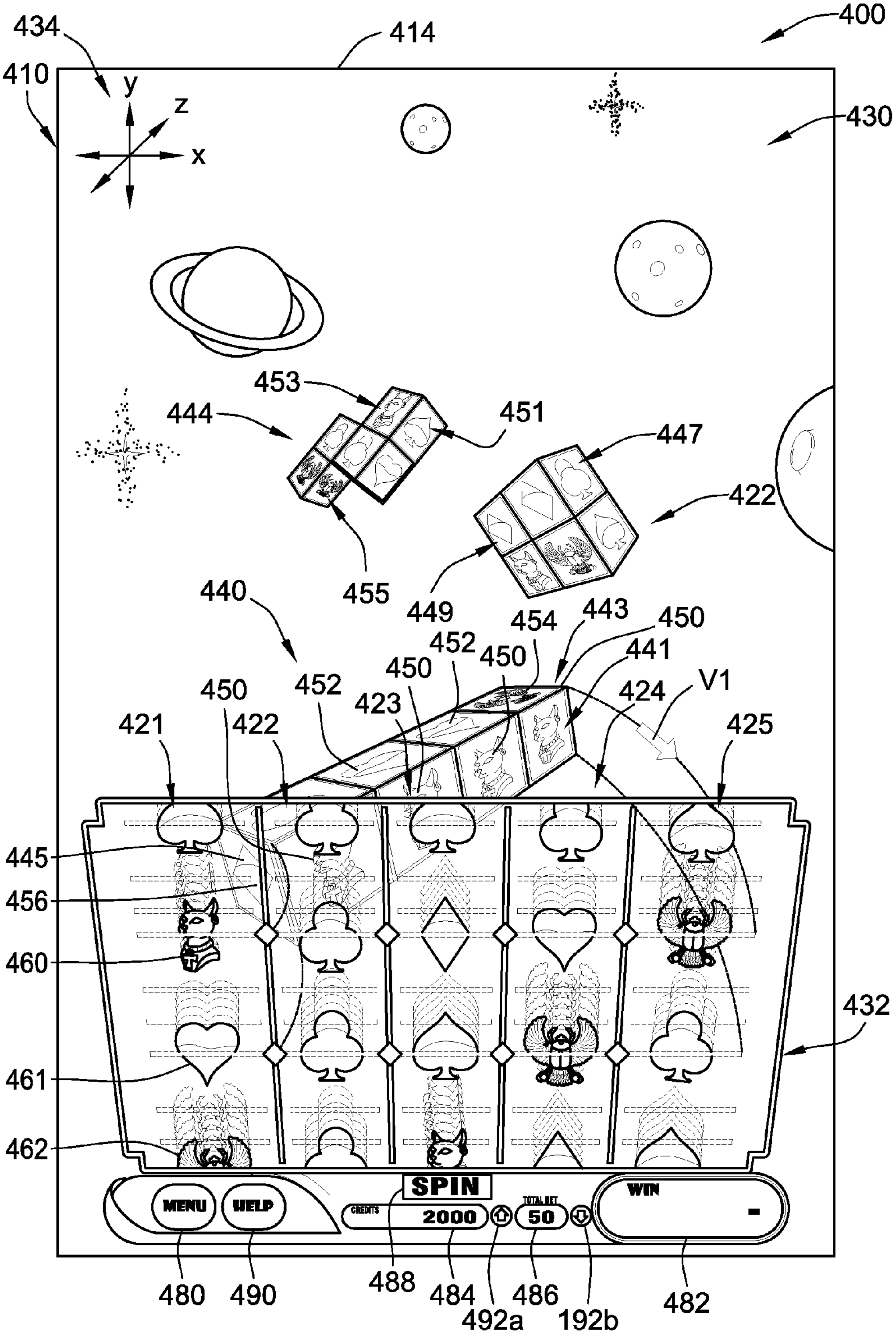
FIG. 4 is a screen shot of a display device displaying an exemplary wagering game with a number of 3-dimensional (3D) objects moving in a 3D space relative to a symbol array in accordance with aspects of the present disclosure.

FIG. 4 is a screen shot of a game screen from an exemplary wagering game in accordance with aspects of the present disclosure. A primary display 414 of a gaming device or terminal 410, which may be part of an exemplary gaming system 400, is shown is FIG. 4. The gaming terminal 410 of FIG. 4 can take on various alternative configurations, including, without limitation, upright freestanding gaming machines, slant-top freestanding gaming machines, handheld and portable gaming machines, countertop gaming machines, personal computers and laptop computers, or other known gaming devices, individually or in any combination thereof. The primary display device 414 of the gaming terminal 410 displays wagering games, such as those described above with respect to FIGS. 1-3 or those described below with respect to FIGS. 4-15, for example. The display device 414 may be any form of display, such as those described with reference to the free-standing gaming terminal 10 of FIG. 1. For instance, the primary display 414 may comprise a plasma, LED, OLED, LCD, CRT, projection, or any other now-known or later-developed display device. Although numerous aspects of the wagering game 430 are all shown displayed on a single display device (i.e., the primary display 414), these aspects are not so limited and can be displayed in any combination on any number of display devices unless otherwise expressly prohibited.

The display device 414 displays or otherwise visually depicts a wagering game 430, which in this example is the slot game shown in FIG. 4. The slot game 430 includes a plurality of symbol-bearing reels, designated generally as 421-425, respectively, each having a plurality of distinct symbol positions and bearing a number of symbols (collectively represented by symbols 460-462). The symbols may include any variety of graphical symbols, emblems, elements, or representations, including symbols that are associated with one or more themes of the gaming terminal 410 and gaming system 400 (e.g., Ancient Egyptian Mythology). The symbols may also include a blank symbol or empty space. The symbols on the reels 421-425 are arranged in an array 432, which in this embodiment is a 3×5 matrix (i.e., three rows by five columns) of symbols. The reels 421-425 are varied (e.g., spun and stopped) to reveal combinations of symbols in the array 432, which represent randomly selected outcomes of the wagering game 430, that are evaluated for winning combinations. Winning combinations of symbols landing, for example, on activated paylines (e.g., those paylines for which a wager has been received), cause awards to be paid in accordance with one or more pay tables associated with the gaming system 400.

Within the scope of this disclosure, the wagering game 430 can include greater or fewer than five symbol-bearing reels (simulated, mechanical, or otherwise) and, in some embodiments, greater or fewer symbol positions than those shown in FIG. 4. In alternate embodiments, the randomly selected outcomes may comprise greater or fewer than 15 symbols, and may take on a variety of different forms having greater or fewer rows and/or columns. The matrix may even comprise other non-rectangular forms or arrangements of symbols. Moreover, the randomly selected outcomes of the wagering game 430 may be varied from the representation provided in FIG. 4. Likewise, Ancient Egyptian Mythology game theme is purely illustrative and non-limiting in nature.

The primary display 414 further includes certain display features for providing information and options to a player. For example, the display 414 features may include a MENU button 480, a WIN meter 482, a CREDITS meter 484, a TOTAL BET meter 486, a SPIN button 488 and a HELP button 490. The MENU button 480 can be pressed and activated (e.g., through an overlying touch screen) by a player desiring to access other control menus, preferences, etc. For example, the player can change a theme of the wagering game 430 via the MENU button 480, or change the type of wagering game being played (e.g., to video poker, blackjack, keno, etc.). The WIN meter 482 displays to the player the amount of the total win (if any) from the most recent play of the wagering game 430. The CREDITS meter 484 displays to the player the total amount of credits (if any) remaining and available to the player for play of the wagering game 430. The TOTAL BET meter 486 displays to a player the current size of his/her wager (in credits). Once a number of paylines are selected and a wager is placed, the SPIN button 488 can be pressed or otherwise activated by a player to effectuate rotation of the reels 421-425. In an optional configuration, selection of the SPIN button 488 will effectuate rotation of the reels 421-425 without requiring prior selection of a wager and/or a number of paylines (e.g., a default wager and a default number of payline(s) are automatically chosen upon selection of the SPIN button 488). The HELP button 490 can be pressed and activated by a player desiring to access help screens or other informational menus.

Fewer, additional or alternative display features may be included for presenting information and/or options to a player. In one specific instance, a row of player-selectable LINES buttons can be provided to give players the option of quickly selecting and activating a predetermined number of paylines (e.g., 1, 5, 9, 20 or 40 lines). Another option would be to display a row of player-selectable PER LINE buttons, which gives a player the option of quickly selecting a predetermined bet per payline (e.g., 1, 2, 3, 5 and 10 credits per activated payline). The primary display 414 can also include, for example, an optional change-denomination button (not shown) that can be activated to change the denomination of wagers (e.g., from 25¢ per credit to $1 per credit) which the player is inputting into the system 400. Other features may include, in some non-limiting examples, one or more bet change buttons 492A and 492B that permit a player to incrementally increase and/or decrease the size of his/her wager, a MAX BET SPIN button (not shown) for wagering a maximum number of credits and contemporaneously varying the reels of the wagering game 430, as well as any of the buttons and meters displayed in FIG. 3 or other features now known or hereinafter developed.

The wagering game 430 is shown in FIG. 4 after play of a base game or bonus game segment is initiated, for example, by the player providing a wager (e.g., responsive to an input via at least one input device) and thereafter pressing a spin button or pulling a spin lever. The monetary wager (e.g., a selected number of credits) is deducted from the available credits (e.g., 2000 credits in FIG. 4), as displayed via the CREDITS meter 484. The monetary wager that is in play (e.g., 50 credits in FIG. 4) can be displayed via the TOTAL BET meter 486. FIG. 4 illustrates the reels 421-425 being spun; the reels 421-425 continue to spin until they are stopped to reveal in the symbol array 432 symbols which represent a randomly selected outcome of the wagering game 430. The wagering-game outcome is, according to some aspects, randomly determined from a plurality of potential wagering-game outcomes. As indicated above, each outcome is evaluated for winning symbol combinations—to determine if the displayed outcome has one or more awards associated therewith.

Figure 5:
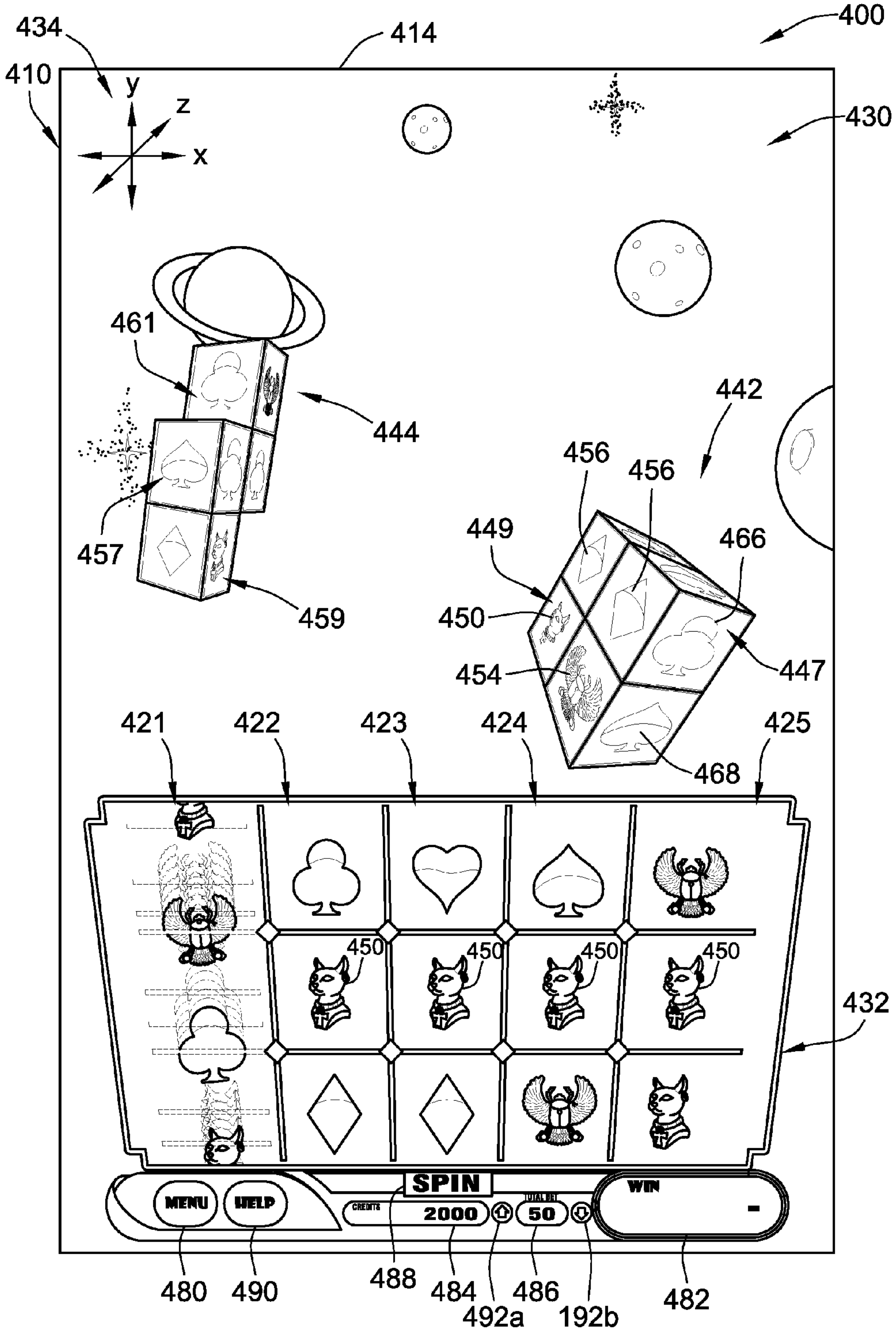
FIG. 5 is a screen shot of a display device displaying the exemplary wagering game of FIG. 5 showing one of the 3D objects interacting with and modifying the symbol array.
Figure 6:
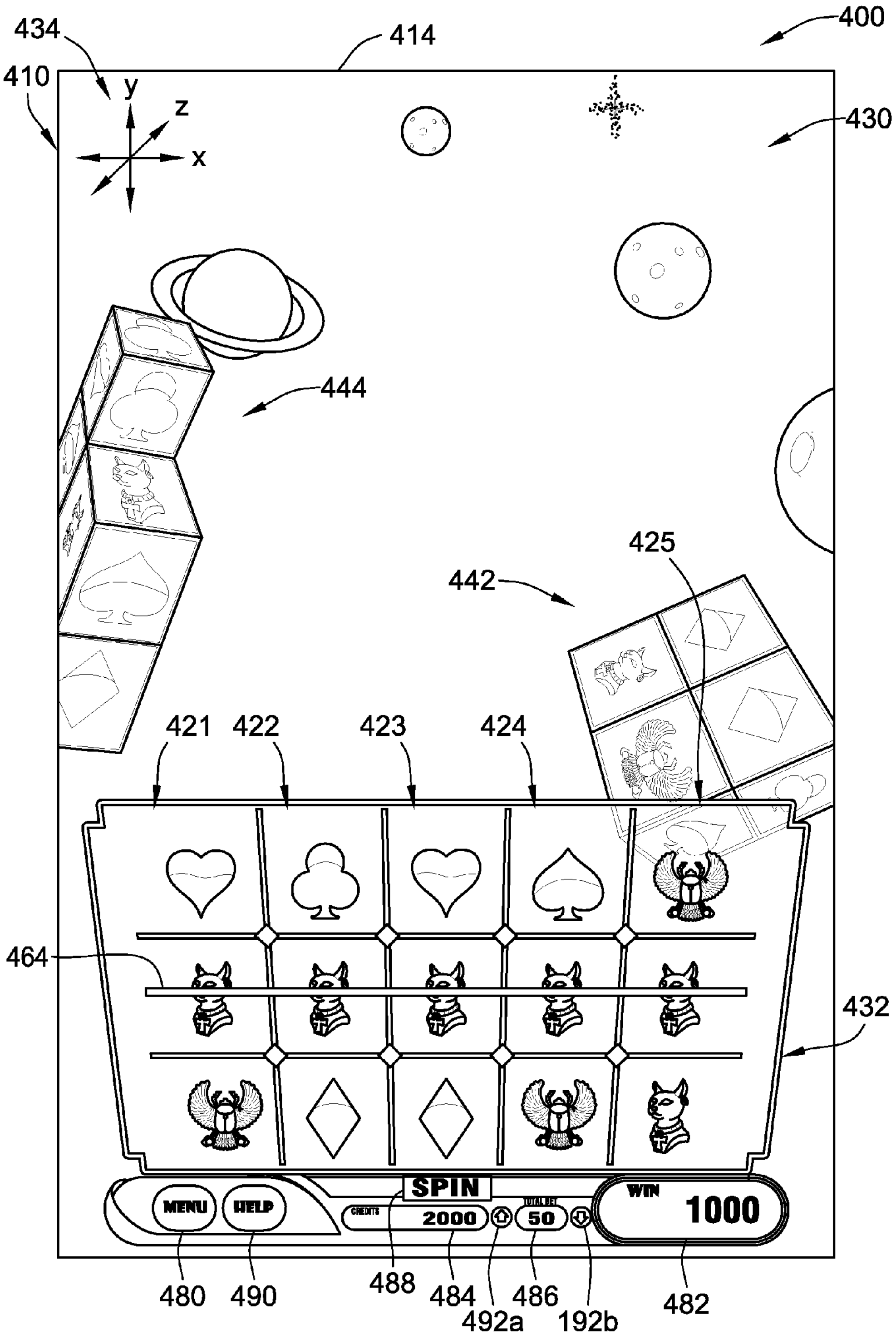
FIG. 6 is a screen shot of a display device displaying the exemplary wagering game of FIG. 5 showing an outcome of the wagering that has been affected by the 3D object interacting with the symbol array.

A local controller (e.g., CPU 30 of FIG. 2), a host system (e.g., external system 48 of FIG. 2), a central controller, or any combination thereof, in alternative embodiments, operates to execute the wagering game program causing the display area 414 to display selected portions of the wagering game 430. An outcome of the wagering game can be randomly selected from a plurality of potential wagering-game outcomes (e.g., using a local random number generator (RNG)). The wagering-game outcome is then revealed, displayed, or otherwise communicated to the player, for example, on a corresponding display device 414. In FIGS. 4-6, the game screen 414 displays the wagering-game outcome by portraying the plurality of simulated reels 421-425 spinning and stopping to reveal a plurality of symbols arranged in a 3-row, 5-column matrix—i.e., symbol array 432. A winning combination occurs, for example, when the displayed symbols correspond to one or more of the winning symbol combinations listed in a pay table. In response, a wagering-game prize (e.g., a monetary award) associated with a winning outcome is conferred upon the player.

The display device 414 displays the symbol array 432 located at a first position of a three-dimensional (3D) space 434. In general, a space can be considered three-dimensional (i.e., existing in three dimensions) by simulating the effect of height, width, and depth, for example. In some embodiments, the 3D space can be exemplified by the X-, Y- and Z-coordinate axes of an eight-quadrant Cartesian coordinate system, designated generally as 434 in FIG. 4. In general, a Cartesian coordinate system specifies each unique point (i.e., location) in a 3D space by three numerical coordinates, represented as (x, y, z), each of which is the signed distance from the point to a respective one of the three mutually perpendicular coordinate axes, measured in the same unit of length. The location of the symbol array 432 in the 3D space 434, in this example, can therefore be designated as $(x_1, y_1, z_1)$. Alternatively, a specific location in a 3D space can be defined using a spherical coordinate system (sometimes referred to as a "horizontal coordinate system"), which specifies each unique point in a 3D space by three numbers: the radial distance, r, the azimuth, $\phi$, and the inclination, $\theta$, collectively represented as $(r, \phi, \theta)$. The radial distance, r, is the signed distance (e.g., along any of the three coordinate axes) from the point to a fixed origin (e.g., the intersection of the X, Y and Z axes). In contrast, the azimuth is an angular measurement from a reference point (e.g., the X-axis) along a horizontal (or "fundamental") plane (e.g., the X-Z plane). The inclination, on the other hand, is the angle from the horizontal plane and the reference point (e.g., along the Y-Z plane). In this instance, the location of the symbol array 432 in the 3D space 434 can be designated as $(r_1, \phi_1, \theta_1)$.

During play of the wagering game 430, which may include any time prior to, during, or after which the reels 421-425 are being spun and stopped, or any time that a player is present at the gaming terminal 410, the display device 514 displays one or more 3D objects—e.g., first, second and third 3D objects 440, 442 and 444, respectively, each of which is located at a respective position in the 3D space 434. For instance, the first 3D object 440 is located at a second position of the 3D space 434 that is distal and distinct from the first position of the symbol array 432. Concomitantly, the second position can be designated $(x_2, y_2, z_2)$ or $(r_2, \phi_2, \theta_2)$. The second 3D object 442, on the other hand, can be said to be located at a third position of the 3D space 434, e.g., designated $(x_3, y_3, z_3)$ or $(r_3, \phi_3, \theta_3)$, which is distinct from the first and second positions. By way of contrast, the third 3D object 444 is located at a fourth position of the 3D space 434, e.g., designated $(x_4, y_4, z_4)$ or $(r_4, \phi_4, \theta_4)$, which is distinct from the first, second and third positions. Optional arrangements may include the 3D objects 440, 442, 444 originating and/or concluding at the same position. As an extension (or alternative) to this concept, the 3D objects 440, 442, 444 can randomly and/or systematically occupy the same position. For instance, one or more of the 3D objects can collide and merge or otherwise fuse together and, thus, occupy the same position. The collision could also result in the objects breaking apart, changing direction, or otherwise modifying their individual attributes, etc. Vice versa, a single 3D object can explode, fragment, or otherwise break apart such that the resulting 3D fragments/objects previously shared a single position for a period of time. Optionally, the display device 514 may display one or more 2D objects, each of which is located at a respective position and moves within the 3D space 434 as described herein.

In the illustrated embodiment, a 3D object 440, 442, 444 has a plurality of faces, each of which defines a distinct surface that lies in a respective plane of the 3D space 434. By way of non-limiting example, the first 3D object 440 is a rectangular hexahedron with six (6) faces, three of which are visible in FIG. 4—first, second and third orthogonal faces 441, 443 and 445, respectively, each of which lies in a distinct plane of the 3D space. The second 3D object 442, although distinct in shape from the first 3D object 440, is also a rectangular hexahedron with six (6) faces; however, only two of these faces—a first face 447 orthogonal to a second face 449, are readily visible in FIG. 4. The third 3D object 444, which is distinct in shape from the other 3D objects 440, 442, is a dodecahedron with 10 faces, three of which are visible in FIG. 4—a first, a second and a third face 451, 453 and 455, respectively, and three of which are visible in FIG. 5—a fourth, a fifth and a sixth face 457, 459 and 461, respectively, each of which lies in a distinct plane of the 3D space. It is certainly envisioned that one or more of the 3D objects displayed via the display device 414 comprise greater or fewer than the number of faces shown in FIG. 4. In some non-limiting examples, the 3D object(s) may be in the nature of a tetrahedron, pentahedron, heptahedron, etc. In this regard, the 3D objects may take on non-polyhedral geometric forms, such a toroids, ellipsoids, etc.

In general, an object can be considered three-dimensional (i.e., existing in three dimensions), for example, by exhibiting the characteristics of height, width, and depth. In the orientation shown in FIG. 4, the height of the first 3D object 440 can be characterized, for example, by the length of the intersection line between the first and third faces 441, 445, while the width can be characterized by the length of the intersection line between the first and second faces 441, 443, and the depth can be characterized by the length of the intersection line between the second and third faces 443, 445. Likewise, both the second and third 3D objects 442, 444 are shown in FIGS. 4-6 exhibiting respective heights, widths, and depths. In addition to their individual positions, one of the distinguishing characteristics between the three 3D-objects 440, 442, 444 is their unique heights, widths, and/or depths. As one specific example, the first 3D object 440 has a greater width but a shorter height than the second 3D object 442 in the orientation shown. Likewise, the third 3D object 444 has a greater height and depth, but a shorter width than the first 3D object 440 in the orientation shown in FIG. 4. However, it is also within the scope and spirit of the present invention to employ 3D objects with matching heights, widths, and/or depths.

With continuing reference to FIG. 4, each of the 3D objects 440, 442, 444 has a number of symbol modifiers (or "symbol enhancers") associated therewith. A "symbol modifier," as used herein, is an element that operates to replace, change, substitute, enhance, degrade, or otherwise modify one or more of the symbols in the symbol array 432. In the illustrated embodiment, for example, a symbol-bearing surface of the first face 441 of the first 3D object 440 bears a first plurality of symbol modifiers, represented by four juxtaposed Egyptian Cat Goddess (Bastet) symbols 450. Contrastingly, a symbol-bearing surface of the second face 443 of the first 3D object 440 bears a second plurality of symbol modifiers, represented by three juxtaposed heart symbols 452 linearly aligned with an Egyptian Beetle Goddess (Khepri) symbol 454. In contrast to the symbol-bearing surfaces of the first and second faces 441, 443, a symbol-bearing surface of the third face 445 of the first 3D object 440 bears a single symbol modifier, which is represented by a diamond symbol 456. In this embodiment, each of the aforementioned symbol modifiers 450, 452, 454, 456 substitutes or otherwise replaces one (or more) of the symbols in the symbol array 432 with which it engages (e.g., "contacts"), as will be developed in further detail below with respect to FIGS. 5 and 6. Similar to the first 3D object 440, each of the faces 447, 449 of the second 3D object 442 bears a respective plurality of symbol modifiers, and the faces 451, 453, 455, 457, 459, 461 of the third 3D object 444 each bears one or more respective symbol modifiers.

It may be desirable, in some embodiments, that each symbol-bearing surface be associated with a different number, type, and/or arrangement of symbol modifiers. Antithetically, it is conceivable that one or more of the symbol-bearing surfaces of one or more of the 3D objects be associated with the same number, type, and/or arrangement of symbol modifiers. One non-limiting example can be found in FIGS. 7-14, where all of the symbol-bearing surfaces of the illustrated 3D object are associated with the same type of symbol modifier (i.e., WILD symbol modifiers). Other symbol modifiers may include, in some non-limiting examples, symbol clumps, bonus-game triggering symbols, payout multipliers, etc. Other options may include unfolding a 3-D Object when it collides with the symbol array 432 such that multiple portions (e.g., modifier-symbol-bearing surfaces) of the 3-D Object engages with and, thus, modifies the symbol array 432. Another option can include a 3-D Object adding or replacing one or more entire reels when it collides with the symbol array 432. Yet another option may include a 3-D Object changing the number and/or orientation of active paylines. Optionally, the collision can reorient the symbol array 432 (e.g., flip it upside down), for example, to position a different combination of symbols along the active payline(s). Another option can include a 3D object "watermarking" one or more symbols to increase any corresponding and future payouts for that symbol. One feature may include a 3D "comet" object that carries one or more bonus symbols and flies from the background of the 3D space 434 and collides with one or more catching symbols on the array 432 to trigger bonus game. Another optional feature would be to include "navigation symbols" on the symbol-bearing reels 421-425, each of which operates to navigate the direction the array 432 moves or, alternatively, the trajectory of one or more of the 3D objects.

Prior to, during, or after the reels 421-425 are spun and stopped, or any time that a player is present at the gaming terminal 410, the display device 414 simulates one or more of the 3D objects 440, 442, 444 and the symbol array 432 moving towards each other in the 3D space 434. FIG. 4, for example, shows the first 3D object 440 moving from the second position towards the symbol array 432 at the first position along a 3D trajectory. The 3D trajectory of an object in a Cartesian system can be represented by a 3D Euclidean vector, such as vector V1, which originates at an initial point ($x_o$, $y_o$, $z_o$), with an initial velocity ($v_{xo}$, $v_{yo}$, $v_{zo}$) and an initial acceleration ($a_{xo}$, $a_{yo}$, $a_{zo}$), and ends at a terminal point ($x_f$, $y_f$, $z_f$), with a final velocity ($v_{xf}$, $v_{yf}$, $v_{zf}$) and a final acceleration ($a_{xf}$, $a_{yf}$, $a_{zf}$). In some embodiments, the direction, velocity and acceleration of the 3D object 440 remains constant. It may be desirable, in some preferred embodiments, to randomly or systematically vary the direction, velocity and/or acceleration of one or more of the 3D objects 440, 442, 444. In other optional arrangements, the symbol array 432 moves in addition to (or in lieu of) the 3D objects 440, 442, 444. In some embodiments, the 3D objects 440, 442, 444 move only when one or more or all of the reels 421-425 are spinning.

As the 3D objects 440, 442, 444 and the symbol array 432 move towards one another, the symbol array 432 or one or more of the 3D objects 440, 442, 444, or a combination thereof, may shift (e.g., pitch, roll, or yaw) such that the relative orientation(s) between these elements changes over time. When comparing FIGS. 4 and 5, for example, the first and second 3D objects 442, 444 are both shown changing their respective orientations as they move towards the symbol array 432. In so doing, the first and second surfaces 447, 449 of the second 3D object 442 each lies along a new respective plane in FIG. 5. Likewise, due to the orientation shift of the third 3D object 444, the first, second and third surfaces 451, 453, 455 shift planes such that they are temporarily hidden from view in FIG. 5. By changing the respective orientation of a 3D object 440, 442, 444 relative to the symbol array 432, the manner in which that 3D object 440, 442, 444 engages and, thus, modifies the symbol array 432 is also changed. This aspect will be developed in further detail below with respect to the embodiments presented in FIGS. 7-14. Optionally, it may be desirable, in some embodiments, to maintain the orientation of one or more of the 3D objects 440, 442, 444 relative to the symbol array 432.

As the 3D objects 440, 442, 444 continue to move closer to the symbol array 432, the 3D objects 440, 442, 444 may (or may not) interact with the symbol-bearing reels 421-425 during play of the wagering game 430. For example, FIG. 6 simulates the third 3D object 444 flying past the symbol array 432 without engaging the symbol array 432 or otherwise modifying any of the symbol-bearing reels 421-425. As game play continues, the gaming system 400/terminal 410 may therefore need to determine if each of the 3D objects 440, 442, 444 in any way engages the symbol array 432 and, if so, how. This determination may be random or, contrastingly, may be based on real-time physics (e.g., based on kinematics, analytical dynamics and collision modeling and control theory). Optionally, in some embodiments, the spinning of the reels can be slowed to build player anticipation as an object is about to hit or otherwise engage with the reels.

If one of the 3D objects 440, 442, 444 does engage the symbol array, the wagering game 430 responsively modifies each of the respective symbols in the symbol array 432 by the respective symbol modifier of the defined surface of the 3D object that engages that symbol. Modifying of the respective symbols in the symbol array 432 can occur prior to, during or after stopping the symbol-bearing reels 421-425 to reveal the symbols indicative of the outcome of the wagering game 430. As an illustration of this aspect, FIG. 4 shows the first 3D object 440 engaging and contemporaneously modifying the symbol array 432. In particular, the display device 414 simulates the first 3D object 440 flying from its initial position (e.g., the second position) up from behind the symbol array 432 such that the symbol array 434 at least partially overlays and, thus, visually obstructs the 3D object 440 as it moves towards the symbol array 432. Using hidden trajectory lines, FIG. 4 depicts the first 3D object 440 aligning and then colliding with the second, third, fourth and fifth reels 422-425 in the middle row of the symbol array 432. As a result of the aforementioned collision, the 3D object 440 causes each of the symbol-bearing reels 422-425 with which it engages to stop spinning, as seen in FIG. 5. Optionally, a 3D object engaging the symbol array 432 can cause all, none, or only selected ones of the symbol-bearing reels 422-425 to stop spinning, start spinning, or any combination thereof. As indicated above, the symbol array 432 includes a number of symbol positions (e.g., 15 symbol positions) that are arranged in a matrix with three rows and five columns. In response to the symbol-bearing surface on the first face 441 of the first 3D object 440 aligning the Bastet symbol modifiers 450 with and contacting the four juxtaposed symbol positions in the second row, right-most four columns of the symbol array 432, all of the symbols in these four symbol positions are replaced by the Bastet symbol modifiers 450, as seen in FIG. 5.

After the collision of the first 3D object 440 with the symbol array 432 and the corresponding modification of the symbol positions thereof, the first symbol-bearing reel 421 continues to spin in FIG. 5. The first symbol-bearing reel 421 stops spinning in FIG. 6 to reveal combinations of symbols, which represent an outcome of the wagering game 430. The revealed symbols are then evaluated for winning combinations. In the illustrated embodiment, a winning combination of five Bastet symbols lands on an activated payline 464, which causes a 1000 credit award to be conferred upon the player, as indicated by the WIN meter 482. Optionally, the five symbol-bearing reels 421-425 can be varied (e.g., spun and stopped) to reveal a wagering-game outcome that is evaluated for an initial award. One or more of the 3D objects 440, 442, 444 subsequently engage (individually, sequentially, etc.) the symbol array 432 to thereby modify one or more symbols thereof and generate one or more modified wagering-game outcomes, each of which can then be evaluated for one or more additional awards.

In some embodiments, the face of the 3D object and, thus, the arrangement and type of symbol modifier(s) that engage the symbols of the symbol array 432 depend, at least in part, on the orientation of the 3D object 440, 442, 444 in the 3D space 434 when the 3D object engages the symbol array 432. With reference back to FIG. 5, the second 3D object 440, for example, includes a first surface 447 with a first number of symbol modifiers—i.e., two symbol modifiers: a club symbol modifier 466 vertically stacked on top of a spade symbol modifier 468, and a second surface 449 with a second number of symbol modifiers i.e., four symbol modifiers: two juxtaposed diamond symbol modifiers 456 stacked on top of a Bastet symbol modifier 450 juxtaposed with a Khepri symbol modifier 454. As such, the number and relative location of symbol positions in the symbol array 432 that are modified in response to the moving 3D object 442 engaging the symbol array 432 depends, at least in part on which of the surfaces 447, 449 engages the symbol array 432. By way of non-limiting example, if the second 3D object 442 generally maintains its current orientation such that the first surface 447 of the 3D object 442 engages the symbol array 432, two vertically stacked symbol positions in the symbol array 432 will be respectively changed into a club symbol and a spade symbol. Contrastingly, if the second 3D object 442 shifts orientation such that the second face 449 thereof aligns with (e.g., faces in a generally parallel manner) the symbol array 432, four of the symbol array 432 symbol positions, which are arranged in a 2×2 matrix, will be changed into diamond, Bastet and Khepri symbols. Optionally, the orientation of a 3D object in the 3D space 434 when the 3D object engages the symbol array 432 depends, at least in part, on the value of the corresponding wager input. The trajectory, shape, orientation, and/or associated symbol modifiers of the 3D objects 440, 442, 444 can be controlled, for example, to incentivize betting frequency and/or size. For instance, the wagering game 430 can incorporate a constant progression of 3D objects that move towards the symbol array 342, and exploit the individual characteristics of these 3D objects to coax players to bet faster and/or place larger bets to take advantage of one or more of these incoming 3D objects. By way of example, the wagering game 430 can be configured such that the types of symbol modifiers borne by the incoming 3D objects are sequentially enhanced (e.g., to include symbol modifiers associated with higher-paying symbols, wild symbols, and/or increasing symbol multipliers) the faster a player wagers and/or the larger the wagers. Another example can include configuring the wagering game 430 such that the objects are more advantageously shaped the faster a player wagers and/or the larger the wagers. This may include fashioning the 3D objects such that larger wagers incrementally increase the number of symbol modifiers that are arranged side-by-side and, thus, will align along a single payline. This feature may also include fashioning larger 3D objects in response to larger wagers such that there are more symbol modifiers. In yet another example, the speeds at which the 3D objects move can be increased or decreased, individually or collectively, based, for example, on the size and/or frequency of the wagers. Likewise, the trajectory can also be varied to change where a particular 3D object engages and, thus, affects the symbol array 432 depending, for example, on the size and/or frequency of the wagers.

Figure 7:
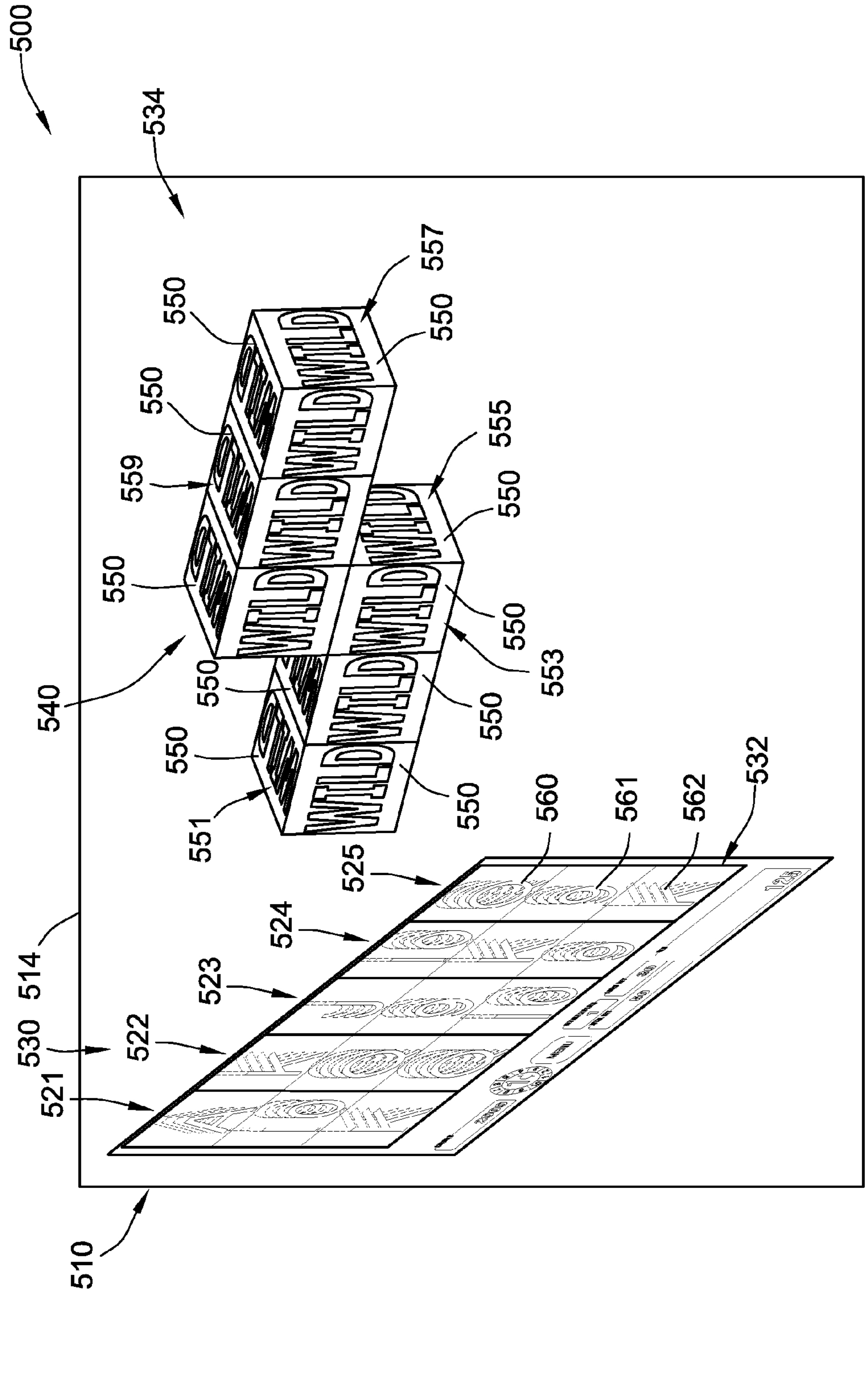
FIG. 7 is a 3D perspective-view illustration of a display device displaying another example of a wagering game with a 3D object moving in a 3D space toward a symbol array in accordance with aspects of the present disclosure.
Figure 10:
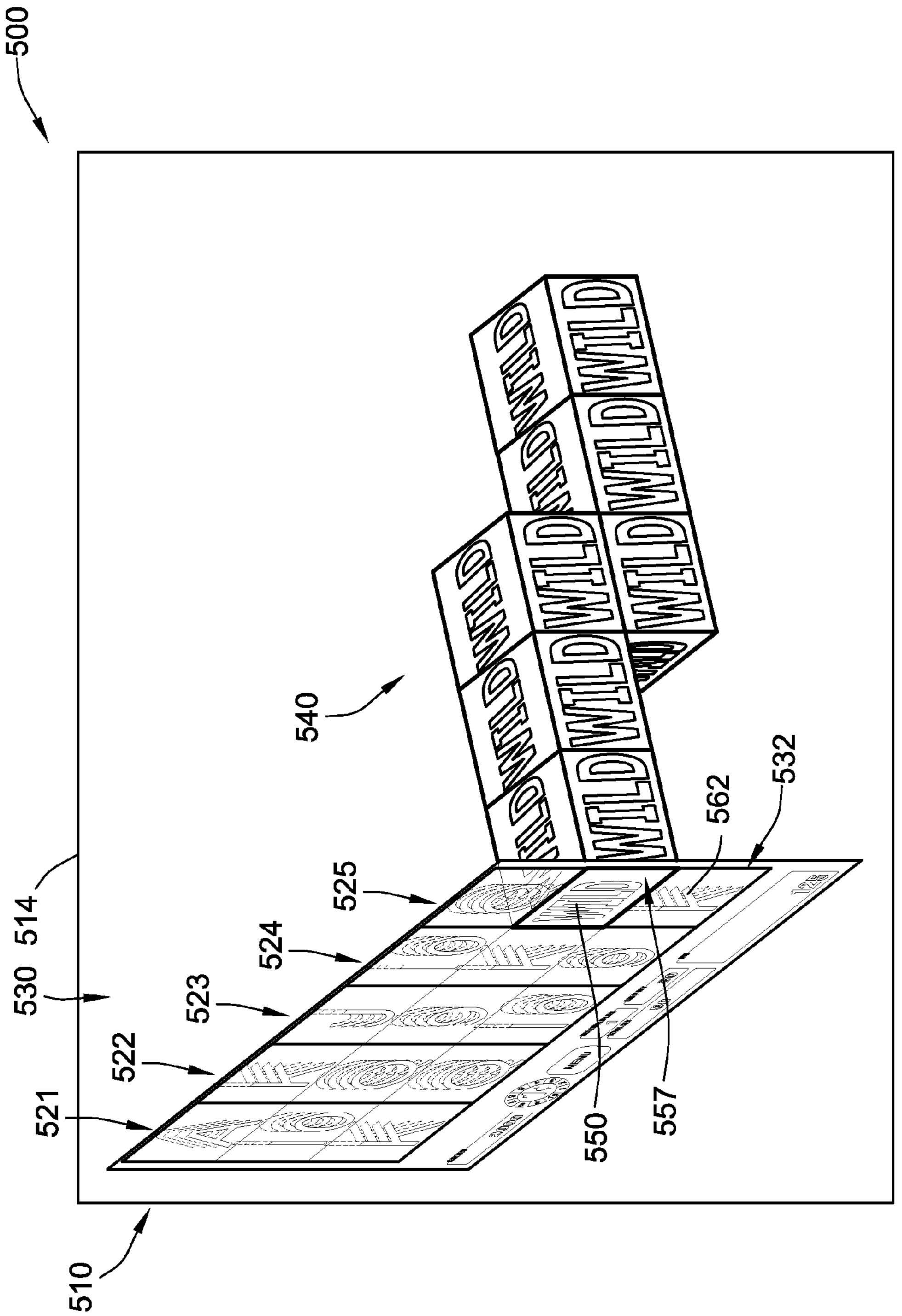
FIG. 10 is a 3D perspective-view illustration of a display device displaying the exemplary wagering game of FIG. 7 showing a different outcome of the wagering that has been affected by the 3D object interacting with the symbol array in an alternative manner.
Figure 11:
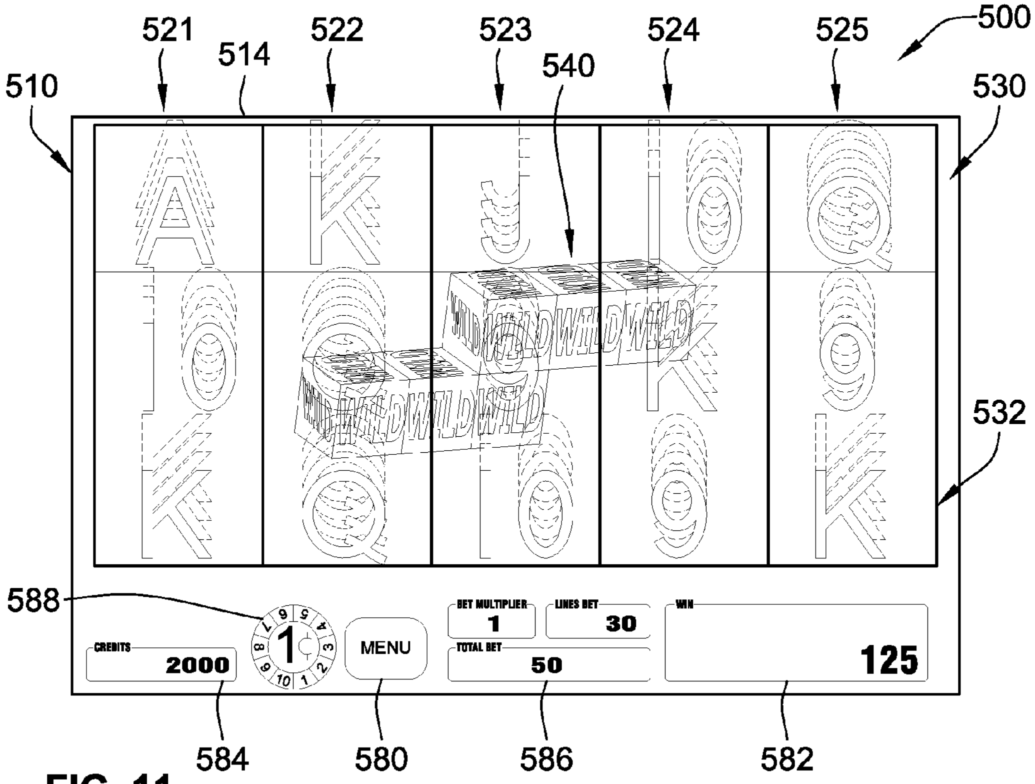
FIG. 11 is a screen shot of a display device displaying the exemplary wagering game shown in FIG. 7 from a front-view perspective.

FIGS. 7 and 11 are alternative screen shots of a game screen from another exemplary wagering game in accordance with aspects of the present disclosure. A primary display 514 of a gaming device or terminal 510, which may be part of an exemplary gaming system 500, is portrayed in FIGS. 7 and 11. The gaming terminal 510 of FIGS. 7 and 11 can take on any of the various forms, optional configurations, and functional alternatives described with respect to the embodiments presented hereinabove. For instance, the primary display 514 of the gaming terminal 510 displays wagering games, including any of those described above with respect to FIGS. 3-6 or those described below with respect to FIGS. 7-15.

The display 514 displays or otherwise visually depicts a wagering game 530, which in this example is the slot game shown in FIGS. 7 and 11. Like the wagering game 430 of FIGS. 3-6, the slot game 530 includes a plurality of symbol-bearing reels, designated generally as 521-525, respectively, each having a plurality of distinct symbol positions and bearing a number of symbols (collectively represented by symbols 560-562 in FIGS. 7 and 11). The symbols on the reels 521-525 are arranged in an array 532, which in this embodiment is a 3×5 matrix of symbols. These reels 521-525 are varied (e.g., spun and stopped) to reveal combinations of symbols in the array 532, which represent randomly selected outcomes of the wagering game 530, that are evaluated for winning combinations. Winning combinations of symbols landing, for example, on activated paylines, cause awards to be paid in accordance with one or more pay tables associated with the gaming system 500. Unless otherwise expressly or logically prohibited, the wagering game 530 may include any of the optional features or alternative aspects described above with respect to the wagering game 430 in FIGS. 4-6.

As seen in FIG. 11, the primary display 514 further includes certain display features for providing information and options to a player. These display 514 features may include, for example, a MENU button 580, a WIN meter 582, a CREDITS meter 584, a TOTAL BET meter 586, a DENOM button 588, each of which may functionally similar to the corresponding meters and buttons described above with respect to the primary display 514 in FIG. 4. In this vein, the additional and alternative display features discussed above may also be incorporated into the primary display 514 of FIGS. 7 and 11.

The wagering game 530 is shown in FIGS. 7 and 11 after play of a base game or bonus game segment is initiated, for example, by the player providing a wager and thereafter pressing a spin button or pulling a spin lever. The wager is deducted from the available credits (e.g., 2000 credits in FIG. 11), as displayed via the CREDITS meter 584. The monetary wager that is in play (e.g., 50 credits in FIG. 11) can be displayed via the TOTAL BET meter 586. FIGS. 7 and 11 illustrate the reels 521-525 being spun; the reels 521-525 continue to spin until they are stopped to reveal in the symbol array 532 symbols which represent a randomly selected outcome of the wagering game 530. The wagering-game outcome is, according to some aspects, randomly determined from a plurality of potential wagering-game outcomes. Each outcome can be evaluated for winning symbol combinations.

Like the embodiment of FIG. 4, the display device 514 displays the symbol array 532 located at a first position of a three-dimensional (3D) space 534. The location of the symbol array 532 in the 3D space 534, in this example, can be designated as ($x_1$, $y_1$, $z_1$) or ($r_1$, $\phi_1$, $\theta_1$). During play of the wagering game 530, which may include any time prior to, during, or after which the reels 521-525 are being varied, for example, the display device 514 displays one or more 3D objects—e.g., 3D object 540, which is located at a second position in the 3D space 534 that is distal and distinct from the first position of the symbol array 432. Concomitantly, the second position can be designated ($x_2$, $y_2$, $z_2$) or ($r_2$, $\phi_2$, $\theta_2$). The 3D object 540 of FIG. 7 is a dodecahedron with 10 faces, five of which are visible in FIG. 7—first, second and third orthogonal faces 551, 553 and 555, respectively, and fourth and fifth orthogonal faces 557 and 559, respectively, each of which lies in a distinct plane of the 3D space 534. Moreover, the 3D object 540 is shown in FIGS. 7-11 exhibiting a height, a width, and a depth.

The 3D object 540, like the 3D objects 440, 442, 444 of FIGS. 4-6, has a number of symbol modifiers (or "symbol enhancers") associated therewith. In the illustrated embodiment, for example, a symbol-bearing surface of the first face 551 of the 3D object 540 bears a first plurality of symbol modifiers, represented by two juxtaposed WILD symbol modifiers 550, whereas a symbol-bearing surface of the second face 553 bears a second plurality of symbol modifiers, represented by six WILD symbol modifiers 450 arranged in two-rows of three juxtaposed symbols. A symbol-bearing surface of the third and fourth faces 555, 5557 each bears a single WILD symbol modifier 550, while a symbol-bearing surface of the fifth face 551 bears a third plurality of symbol modifiers, represented by three juxtaposed WILD symbol modifiers 550.

Prior to, during, or after the reels 521-525 are spun and stopped, or any time that a player is present at the gaming terminal 510, the display device 514 simulates the 3D object 540 and the symbol array 532 moving towards each other in the 3D space 534. FIG. 7, for example, shows the 3D object 540 moving along a 3D trajectory from a starting location behind the array 532 (e.g., the "second position") towards a final location, which is in the same direction as the first position of the symbol array 532. During this movement, the perspective view of the display screen could change to one or more different angles (e.g., back and forth between the views shown in FIG. 7 and FIG. 11, or anywhere in between), for example, to exaggerate or otherwise highlight the movement and potential or impending impact of an object with the array.

Figure 9:
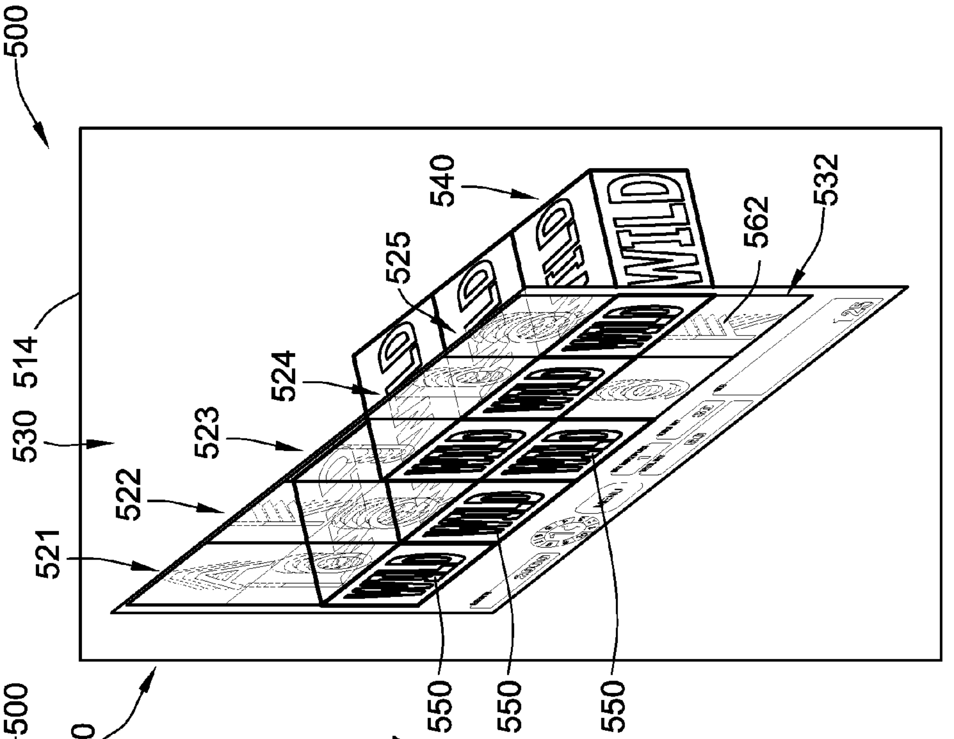
FIG. 9 is a 3D perspective-view illustration of a display device displaying the exemplary wagering game of FIG. 7 showing an outcome of the wagering that has been affected by the 3D object interacting with the symbol array.
Figure 8:
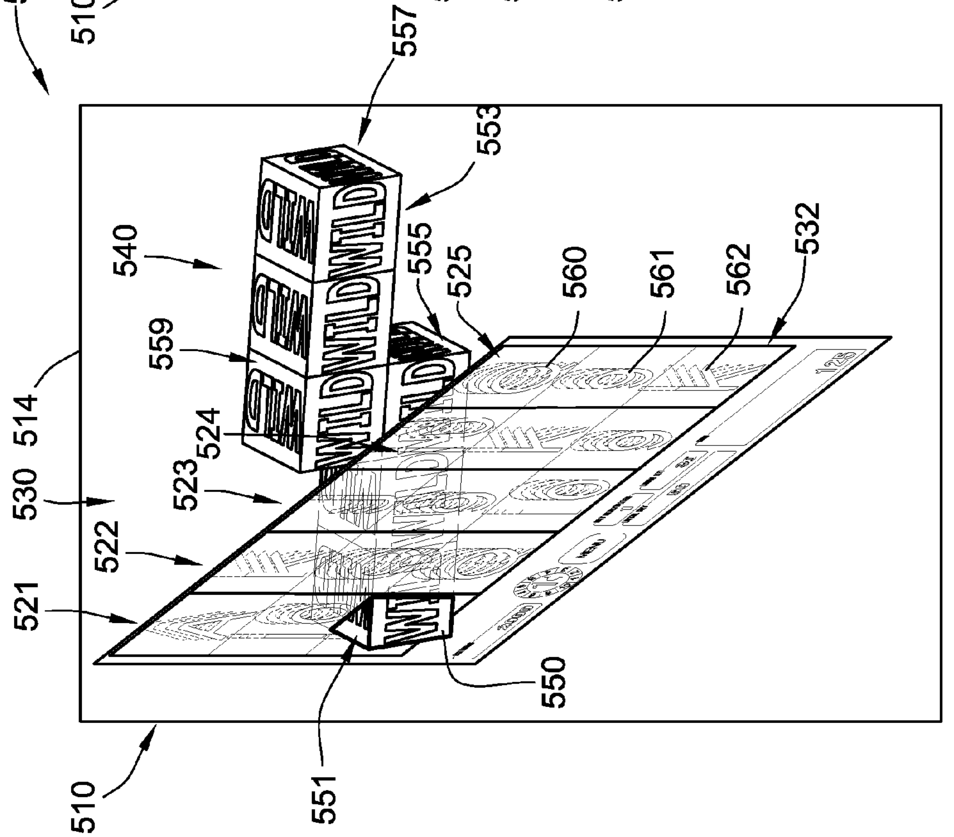
FIG. 8 is a 3D perspective-view illustration of a display device displaying the exemplary wagering game of FIG. 7 showing the 3D object interacting with and modifying the symbol array.
Figure 12:
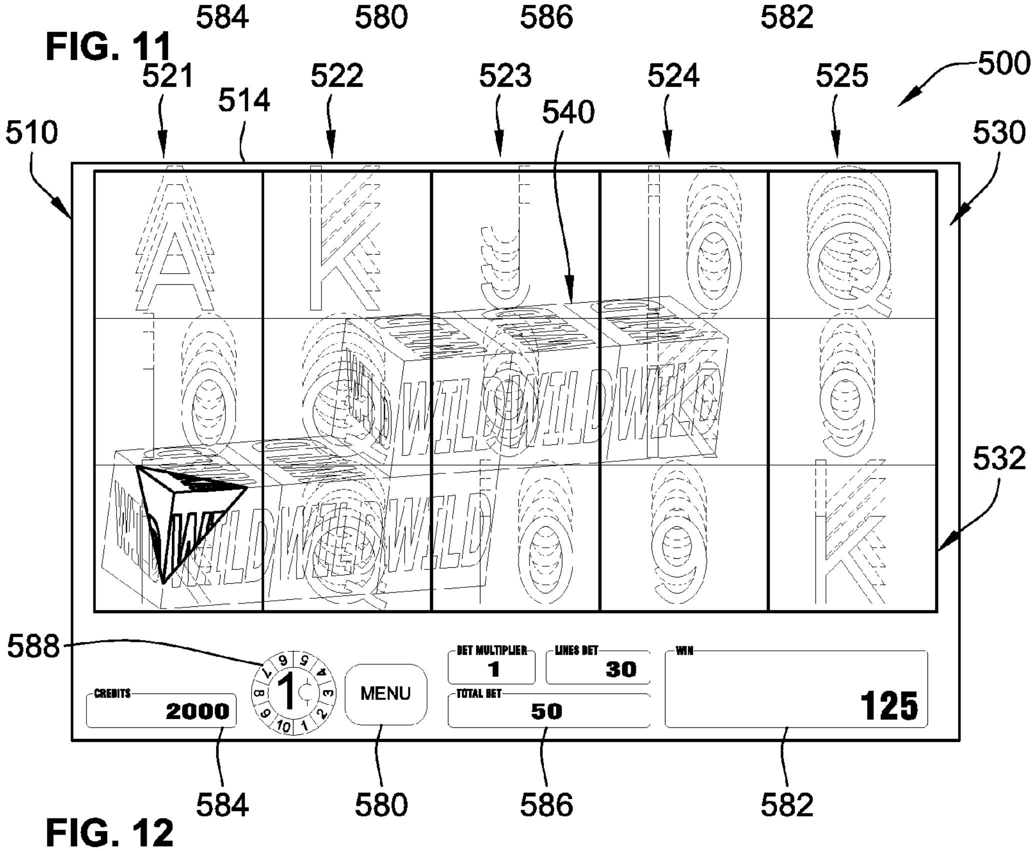
FIG. 12 is a screen shot of a display device displaying the exemplary wagering game shown in FIG. 8 from a front-view perspective.
Figure 13:
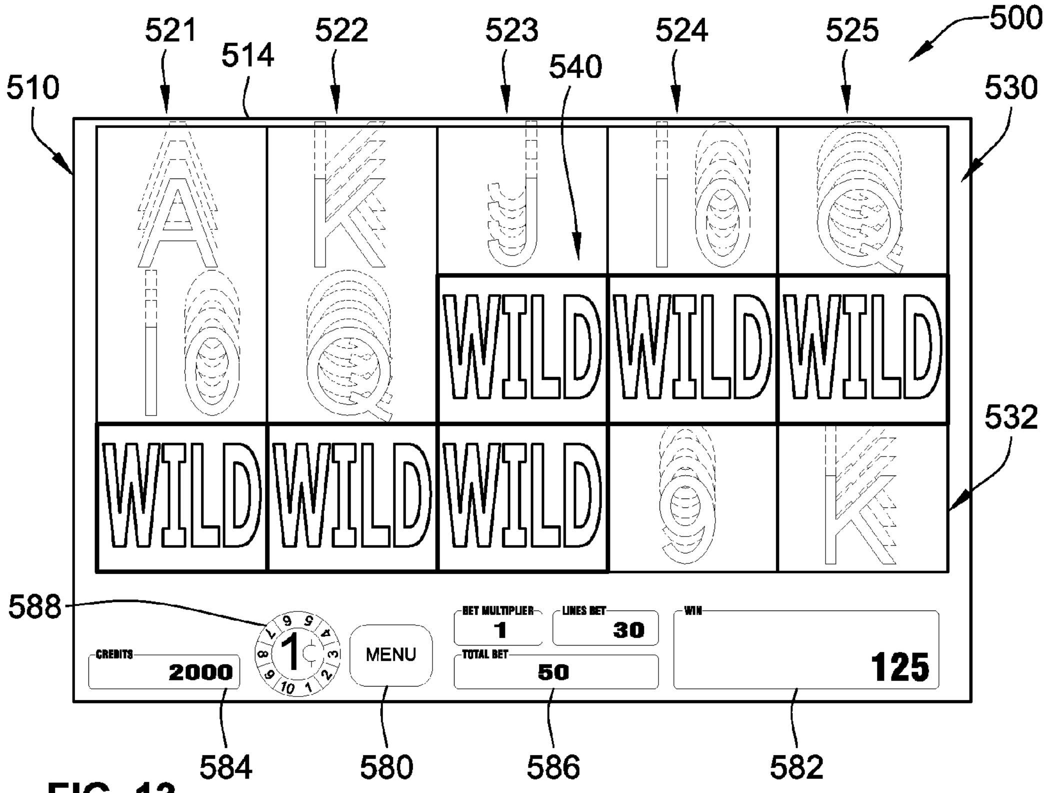
FIG. 13 is a screen shot of a display device displaying the exemplary wagering game shown in FIG. 9 from a front-view perspective.
Figure 14:
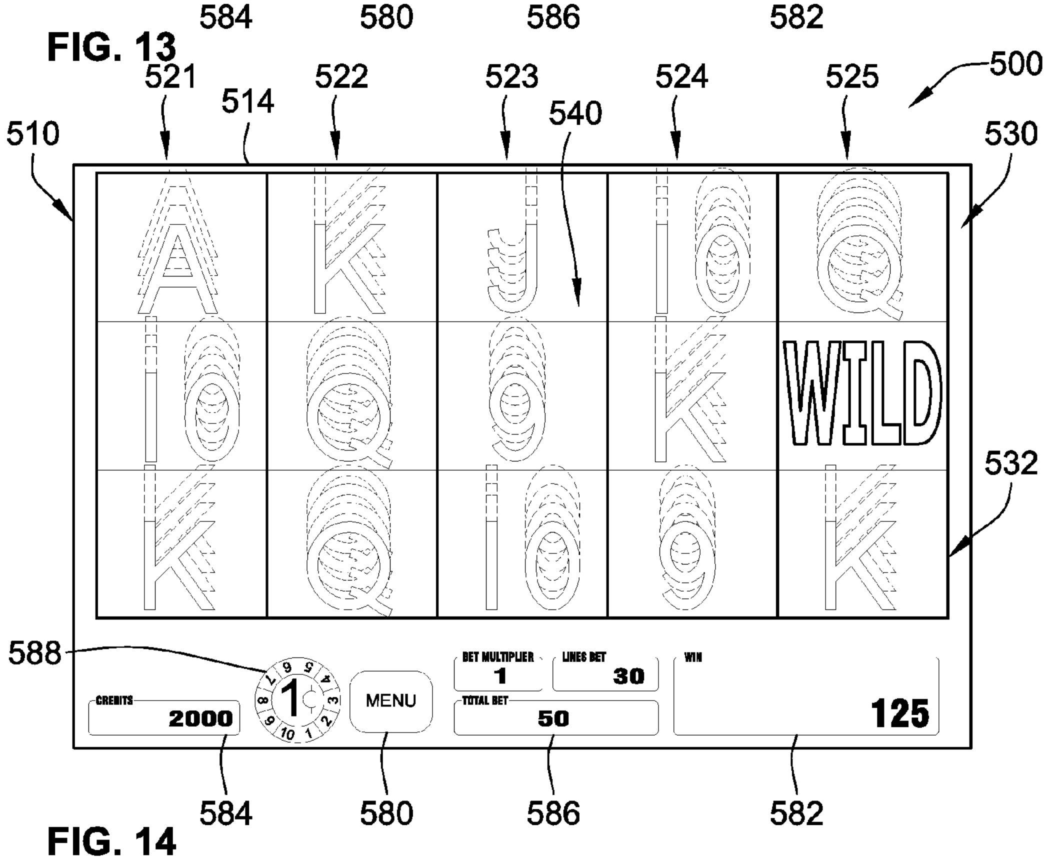
FIG. 14 is a screen shot of a display device displaying the exemplary wagering game shown in FIG. 10 from a front-view perspective.

During play of the wagering game 530, the 3D object 540 engages with all five of the symbol-bearing reels 521-525. Initially, the left-most WILD symbol modifier 550 on the second modifier-symbol-bearing face 553 of the 3D object 540 engages the bottom-most symbol position on the first reel 521 in the symbol array 532, as seen in FIGS. 8 and 12. During this initial engagement, all five of the symbol-bearing reels 521-525 continue to spin. As described above, alternative configurations can require stopping each of the reels 521-525 that is engaged by the 3D object 540. In some embodiments, the 3D object 540 may continue on a generally rectilinear path, generally perpendicular to the array 532, engaging selected symbol positions of the symbol array 532 along the way. In an alternative embodiment, only the initially engaged symbol is engaged and concomitantly modified. By way of contrast, the 3D object 540 is shown in FIGS. 9 and 13 shifting orientation such that all six of the WILD symbol modifiers 550 on the second face 553 aligns with and engages the symbol array 532. Responsively, the remainder of the 3D object 540 disappears and each of the respective symbols in the symbol array 532 is modified by the respective WILD symbol modifier 550 of the second surface 553 of the 3D object 540 that engages that symbol position. Specifically, each of the WILD symbol modifiers 550 on the second surface 553 aligns with and contacts a respective symbol position, and operates to insert, change, replace or otherwise modify that symbol position with a WILD symbol, as seen in FIGS. 9 and 13. In this instance (from left-to-right in FIG. 13), the first three symbol positions in the bottom row and the last three symbol positions in the middle row of the symbol array 532 are replaced with the WILD symbol modifiers 550. After the collision of the 3D object 540 with the symbol array 532 and the corresponding modification of the symbol positions thereof, the symbol-bearing reels 521-525 stop spinning to reveal combinations of symbols, which represent an outcome of the wagering game 530, which is then evaluated for winning combinations.

FIG. 10 shows an alternative outcome resulting from the 3D object 540 shifting orientation before engaging the symbol array 540. As the 3D object 540 and symbol array 532 move towards one another, the symbol array 532 and/or the 3D object 540 shifts such that the relative orientations between these elements changes. When comparing FIGS. 9 and 10, for example, the 3D object 540 is shown with a different orientation relative to the symbol array 532. In so doing, only the fourth modifier-symbol-bearing surface 557 of the 3D object 540 engages and modifies the symbol array 532. In this instance (from left-to-right in FIG. 14), only the last symbol position in the middle row of the symbol array 532 is replaced with a WILD symbol modifiers 550.

Figure 15:
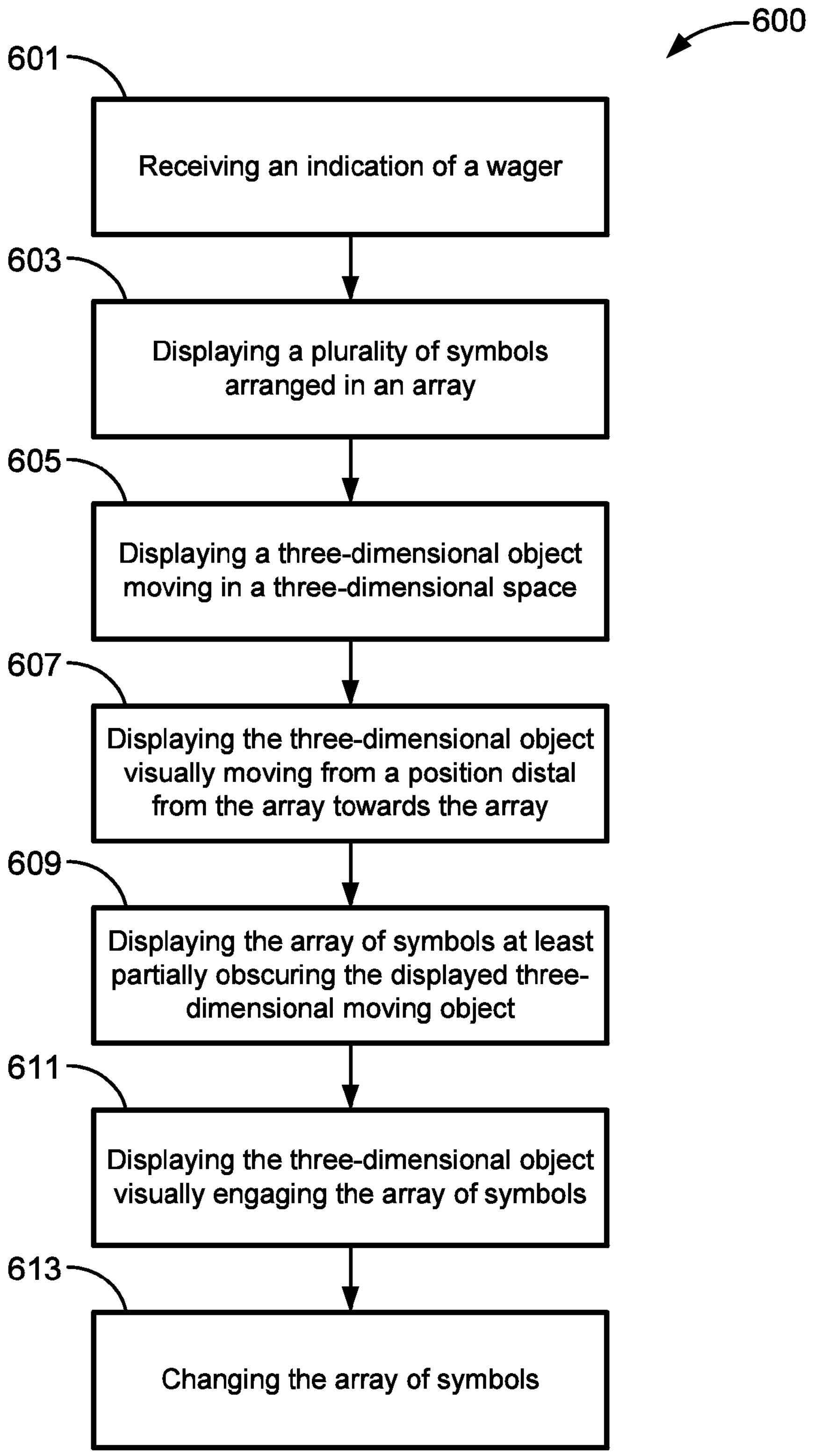
FIG. 15 is a flowchart for an exemplary method or algorithm that can correspond to instructions that can be stored on one or more non-transitory computer-readable media and can be executed by one or more controllers in accord with aspects of the disclosed concepts.

With reference now to the flow chart of FIG. 15, an improved method for conducting a wagering game on a gaming terminal or gaming device, such as the gaming terminal 10 shown in FIG. 1, and/or a gaming system, such as the gaming system shown in FIG. 2, is generally described at 600 in accordance with aspects of the present disclosure. FIG. 15 can be representative of an algorithm that corresponds to at least some instructions that can be stored, for example, in memory 32 of FIG. 2, and executed, for example, by the CPU 30 and/or external system(s) 48 of FIG. 2 to perform any or all of the above or below described functions associated with the disclosed concepts. The method 600 will be described with reference to the various aspects and features shown in FIGS. 4-14 of the drawings; such reference is being provided purely by way of explanation and clarification.

The method 600 begins at block 601 by receiving (e.g., via an input device such as touch screen 18, bill validator 22, information reader/writer 24, etc.) an indication of a wager to play a wagering game. At block 603, an outcome of the wagering game is displayed, for example, as a plurality of symbols arranged in an array, such as symbol array 432 of FIG. 4 or symbol array 532 of FIG. 7. This may include, as indicated above, an RNG generating a random number, game logic for determining the outcome based on the randomly generated number, and the CPU 42, the external system 48, or both, in alternative embodiments, operating to execute a wagering game program, and game assets (e.g., art, sound, etc.) for presenting the determined outcome to a player in a visual manner.

The method 600 continues to block 605, which includes simulating, e.g., via primary display device 12, secondary display device 14, or both, a 3D object moving in a 3D space. The 3D object (e.g., first, second and/or third 3D objects 440, 442, 444 of FIGS. 4-6) is visually simulated as moving from a position distal from the symbol array to a position proximal with, adjacent to, and/or at least partially overlapping with the symbol array, as indicated at block 607. During at least a portion of the movement of the 3D object, block 609 indicates that the array of symbols is depicted at least partially visually obstructing/obscuring the displayed 3D object. At block 611, the 3D object is depicted visually engaging the array of symbols and, at block 613, changing the array of symbols.

In some embodiments, the method 600 includes at least those steps enumerated above. It is also within the scope and spirit of the present invention to omit steps, include additional steps, and/or modify the order presented above. It should be further noted that the method 600 represents a single play of a wagering game. However, it is expected that the method 600 be applied in a systematic and repetitive manner.

Any of the methods described herein can include machine readable instructions for execution by: (a) a processor, (b) a controller, and/or (c) any other suitable processing device. Any algorithm, software, or method disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented in any flowchart depicted herein may be implemented manually. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined While many preferred embodiments and best modes for carrying out the present invention have been described in detail above, those familiar with the art to which this invention relates will recognize various alternative designs and embodiments for practicing the invention within the scope of the appended claims.

What is claimed is:

1. A gaming system for playing a wagering game, the gaming system comprising:

a cabinet configured to house electronic components operable for conducting the wagering game;

at least one electronic input device coupled to the cabinet and configured to receive a physical input from a player to initiate the wagering game and transform the physical input into an electronic data signal;

at least one electronic display device coupled to the cabinet and operable to display aspects of the wagering game;

at least one electronic random element generator configured to generate one or more random elements associated with play of the wagering game;

at least one processor; and at least one memory device storing instructions which, when executed by the at least one processor, cause the gaming system to:

initiate the wagering game in response to the electronic data signal generated by the at least one electronic input device responsive to the physical input from the player;

determine an outcome of the wagering game based, at least in part, on the one or more random elements generated by the at least one electronic random element generator;

display, via the at least one electronic display device, a symbol array located at a first position of a three-dimensional (3D) space;

display, via the at least one electronic display device, a 3D object located at a second position of the 3D space, the 3D object having two or more defined surfaces each lying in a respective plane of the 3D space and each having associated therewith a respective symbol modifier;

display, via the at least one electronic display device, the 3D object moving from the second position towards the symbol array at the first position;

display, in the symbol array, a plurality of symbols indicative of the randomly determined outcome of the wagering game; and in response to the 3D object with two or more defined surfaces visible on the at least one electronic display device moving to and engaging the symbol array, modify each of the symbols in the symbol array by the symbol modifier of the defined surface of the 3D object that engages the symbol.

2. The gaming system of claim 1, wherein the at least one memory device stores additional instructions which cause the gaming system to display the 3D object moving past the symbol array at the first position such that the 3D object does not engage the symbol array and the symbol modifiers do not modify any of the symbols in the symbol array.

3. The gaming system of claim 1, wherein the 3D object, when moving from the second position towards the first position, changes orientation such that each of the defined surfaces of the 3D object lies along a new respective plane.

4. The gaming system of claim 3, wherein the symbol modifier of the defined surface of the 3D object that engages each of the symbols of the symbol array depends, at least in part, on the orientation of the 3D object in the 3D space when the 3D object engages the symbol array.

5. The gaming system of claim 4, wherein the orientation of the 3D object in the 3D space when the 3D object engages the symbol array depends, at least in part, on a value of a wager input received from the player.

6. The gaming system of claim 1, wherein the two or more defined surfaces includes a first surface with a first number of symbol modifiers and a second surface with a second number of symbol modifiers distinct from the first number of symbol modifiers, and wherein the number of symbols in the symbol array modified in response to the moving 3D object engaging the symbol array depends on which of the first and second surfaces engages the symbols.

7. The gaming system of claim 1, wherein the second position is located behind the first position in the 3D space such that the symbol array at least partially visually obstructs the 3D object as the 3D object moves from the second position towards the first position.

8. The gaming system of claim 1, wherein the at least one memory device stores additional instructions which cause the gaming system to:

display a second 3D object, which is distinct in shape from the 3D object, located at a third position of the 3D space, the second 3D object having two or more defined surfaces each lying in a respective plane of the 3D space and each having associated therewith a respective symbol modifier;

display the second 3D object moving from the third position towards the symbol array at the first position;

display, in the symbol array, a second plurality of symbols indicative of a second randomly determined outcome of the wagering game; and in response to the second 3D object moving to and engaging the symbol array, modify each of the respective symbols in the symbol array by the symbol modifier of the defined surface of the second 3D object that engages the symbol.

9. The gaming system of claim 1, wherein the symbol array includes a number of symbol positions arranged in a plurality of columns, and wherein the modifying the symbols in the symbol array is responsive to one or more of the defined surfaces of the 3D object aligning with one or more of the symbol positions when the 3D object engages the symbol array.

10. The gaming system of claim 1, wherein the symbol array is populated by a plurality of symbol-bearing reels, wherein the displaying of the plurality of symbols indicative of the outcome of the wagering game includes spinning and stopping the symbol-bearing reels, and wherein the modifying each of the symbols in the symbol array is prior to stopping the symbol-bearing reels to reveal the symbols indicative of the outcome of the wagering game.

11. The gaming system of claim 10, wherein the 3D object causes each of the symbol-bearing reels with which the 3D object engages to stop spinning.

12. The gaming system of claim 1, wherein the two or more defined surfaces includes a first, a second and a third defined surface each lying in a respective plane of the 3D space and each bearing a distinct plurality of symbol modifiers.

13. A gaming system for conducting a wagering game, the gaming system comprising:

one or more cabinets for housing electronic components operable for conducting the wagering game;

one or more electronic input devices configured to receive one or more physical inputs and transform the one or more physical inputs into one or more electronic data signals;

one or more electronic random element generators configured to generate one or more random elements associated with play of the wagering game;

one or more electronic display devices operable to display one or more aspects of the wagering game;

one or more processors;

one or more memory devices storing instructions which, when executed by at least one of the one or more processors, cause the gaming system to:

receive, via at least one of the one or more electronic input devices, a physical input as an indication of a wager to play the wagering game;

initiate the wagering game in response to an electronic data signal generated by at least one of the one or more electronic input devices in response to the physical input indicative of the wager;

determine an outcome of the wagering game based, at least in part, on one or more random elements generated by at least one of the one or more electronic random element generators;

display, in an array located at a first position of a three-dimensional (3D) space of at least one of the one or more electronic display devices, symbols associated with outcomes of the wagering game;

display, via at least one of the one or more electronic display devices, a 3D object located at a second position of the 3D space, the 3D object having a plurality of faces each lying in a respective plane of the 3D space, each of the faces bearing a respective symbol modifier;

display, via at least one of the one or more electronic display devices, the 3D object moving towards the symbol array or the symbol array moving towards the 3D object, or both;

determine if the 3D object engages the symbol array;

in response to the 3D object with two or more defined surfaces visible on at least one of the one or more electronic display devices moving to and engaging the symbol array, modify each of the symbols in the symbol array by the symbol modifier of the defined surface of the 3D object that engages the symbol; and display, in the symbol array, a plurality of symbols indicative of an outcome of the wagering game, the wagering-game outcome being randomly determined from a plurality of wagering-game outcomes.

14. A computer-implemented method of conducting a wagering game on a gaming system with at least one electronic input device configured to receive physical inputs from players and transform the physical inputs into electronic data signals, at least one electronic display device configured to display outcomes of the wagering game, at least one electronic random element generator configured to generate random elements associated with play of the wagering game, and at least one processor, the computer-implemented method comprising:

receiving, via the at least one electronic input device, a physical input from a player as an indication of a wager;

initiating, via the at least one processor, the wagering game in response to an electronic data signal generated by the at least one electronic input device responsive to the physical input of the wager from the player;

determining, via the at least one processor, an outcome of the wagering game based, at least in part, on one or more random elements generated by the at least one electronic random element generator, the outcome being randomly determined from a plurality of available wagering-game outcomes;

displaying, via the at least one electronic display device, symbols associated with outcomes of the wagering game arranged in an array located at a first position of a three-dimensional (3D) space;

displaying, via the at least one electronic display device, a 3D object located at a second position of the 3D space, the 3D object having two or more defined surfaces each lying in a respective plane of the 3D space, each of the defined surfaces of the 3D object having associated therewith a respective symbol modifier;

displaying, via the at least one electronic display device, the 3D object moving in the 3D space from the second position towards the symbol array at the first position;

displaying, in the symbol array, a plurality of symbols indicative of the randomly determined outcome of the wagering game; and in response to the 3D object with two or more defined surfaces visible on the at least one electronic display device moving to and engaging the symbol array, modifying each of the symbols in the symbol array by the symbol modifier of the defined surface of the 3D object that engages the symbol.

15. The computer-implemented method of claim 14, further comprising displaying the 3D object moving past the symbol array such that the 3D object does not engage the symbol array and the symbol modifiers do not modify any of the symbols in the symbol array.

16. The computer-implemented method of claim 14, further comprising displaying the 3D object changing orientation when moving from the second position towards the first position such that each of the defined surfaces of the 3D object lies along a new respective plane.

17. The computer-implemented method of claim 16, wherein the symbol modifier of the defined surface that engages the symbol of the symbol array depends, at least in part, on the orientation of the 3D object in the 3D space when the 3D object engages the symbol array.

18. The computer-implemented method of claim 14, wherein the two or more defined surfaces includes a first surface with a first number of symbol modifiers and a second surface with a second number of symbol modifiers distinct from the first number of symbol modifiers, and wherein the number of symbols in the symbol array modified in response to the moving 3D object engaging the symbol array depends on which of the first and second surfaces engages the symbols.

19. The computer-implemented method of claim 14, further comprising displaying the 3D object moving towards the first position from behind the symbol array such that the symbol array at least partially visually obstructs the 3D object as the 3D object moves from the second position towards the first position.

20. The computer-implemented method of claim 14, further comprising:

displaying, via the display device, a second 3D object, which is distinct in shape from the 3D object, located at a third position of the 3D space, the second 3D object having two or more defined surfaces each lying in a respective plane of the 3D space and each having associated therewith a respective symbol modifier;

displaying, via the display device, the second 3D object moving from the third position towards the symbol array at the first position;

displaying, in the symbol array, a second plurality of symbols indicative of a second randomly determined outcome of the wagering game; and in response to the second 3D object moving to and engaging the symbol array, modifying each of the symbols in the symbol array by the symbol modifier of the defined surface of the second 3D object that engages the symbol.

21. The computer-implemented method of claim 14, wherein the symbol array includes a number of symbol positions arranged in a plurality of columns, and wherein the modifying the symbols in the symbol array is responsive to one or more of the defined surfaces of the 3D object aligning with one or more of the symbol positions when the 3D object engages the symbol array.

22. The computer-implemented method of claim 14, wherein the symbol array is populated by a plurality of symbol-bearing reels, wherein the displaying of the plurality of symbols indicative of the outcome of the wagering game includes spinning and stopping the symbol-bearing reels, and wherein the modifying each of the symbols in the symbol array is prior to stopping the symbol-bearing reels to reveal the symbols indicative of the outcome of the wagering game.

23. The computer-implemented method of claim 14, wherein the 3D object is a polyhedron, and the two or more defined surfaces includes a first, a second, a third and a fourth defined surface each lying in a respective plane of the 3D space and each bearing a distinct symbol modifier.

24. A method of conducting a wagering game on a gaming system, the method comprising:

receiving, via at least one electronic input device, a physical input from a player as an indication of a wager to play the wagering game;

initiating, via at least one processor, the wagering game in response to an electronic data signal generated by the at least one electronic input device responsive to the physical input of the wager from the player;

determining, via at least one processor, an outcome of the wagering game based, at least in part, on one or more random elements generated by at least one electronic random element generator;

displaying, via at least one electronic display device, an array of symbol positions arranged in a plurality of columns;

displaying, via the at least one electronic display device, a three-dimensional (3D) object having a plurality of defined surfaces, each of the defined surfaces bearing a symbol enhancer;

causing the 3D object to visually move in a 3D space from a position distal from the array of symbol positions towards the array of symbol positions such that the displayed array of symbol positions at least partially visually obstructs or obscures the moving 3D object;

causing the 3D object to visually engage with the array;

in response to one or more of the defined surfaces of the moving 3D object with two or more defined surfaces visible on the at least one electronic display device being in a predetermined alignment with the array of symbol positions during the engagement such that the one or more of the defined surface areas corresponds with one or more corresponding symbol positions of the array of symbol positions, adding the symbol enhancer of the one or more of the defined surface areas of the moving 3D object to the corresponding symbol positions of the array of symbol positions.

25. An electronic gaming machine dedicated to playing a wagering game, the electronic gaming machine comprising:

a cabinet housing electronic components operable for conducting the wagering game;

one or more electronic input devices mounted on the cabinet and configured to receive one or more physical inputs from players and generate one or more electronic data signals indicative of the one or more physical inputs;

one or more electronic display devices mounted on the cabinet and operable to display one or more aspects of the wagering game;

one or more electronic random element generators mounted in the cabinet and configured to generate one or more random elements associated with play of the wagering game;

one or more processors mounted in the cabinet; and one or more memory devices storing instructions which, when executed by at least one of the one or more processors, cause the electronic gaming machine to:

receive, via at least one of the one or more electronic input devices, a physical input from a player to initiate the wagering game;

initiate the wagering game in response to an electronic data signal generated by at least one of the one or more electronic input devices responsive to the physical input from the player;

determine an outcome of the wagering game based, at least in part, on one or more random elements generated by the at least one of the one or more electronic random element generators;

display, via at least one of the one or more electronic display devices, a symbol array located at a first position of a three-dimensional (3D) space;

display, via at least one of the one or more electronic display devices in the symbol array, a plurality of symbols indicative of the randomly determined outcome of the wagering game;

display, via at least one of the one or more electronic display devices, a 3D object located at a second position of the 3D space, the 3D object having two or more defined surfaces each lying in a respective plane of the 3D space and each having associated therewith a respective symbol modifier;

display, via at least one of the one or more electronic display devices, the 3D object moving from the second position towards the first position; and in response to the 3D object with two or more defined surfaces visible on at least one of the electronic display devices moving to and touching the symbol array, modify each of the symbols in the symbol array by the symbol modifier of the defined surface of the 3D object that touches that symbol.

* * * * *